United States Patent
Nagao et al.

(10) Patent No.: US 11,994,446 B2
(45) Date of Patent: May 28, 2024

(54) DETERIORATION ESTIMATOR FOR ELECTRONIC THROTTLE DEVICE

(71) Applicant: AISAN KOGYO KABUSHIKI KAISHA, Obu (JP)

(72) Inventors: Kazuki Nagao, Nagoya (JP); Koki Hirata, Obu (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 18/080,716

(22) Filed: Dec. 13, 2022

(65) Prior Publication Data

US 2023/0109701 A1    Apr. 13, 2023

(30) Foreign Application Priority Data

Dec. 20, 2021   (JP) .................................. 2021-205961

(51) Int. Cl.
*G01M 15/04*    (2006.01)

(52) U.S. Cl.
CPC .................................. *G01M 15/042* (2013.01)

(58) Field of Classification Search
CPC .................................................. G01M 15/042
See application file for complete search history.

(56) References Cited

U.S. PATENT DOCUMENTS

| | | | |
|---|---|---|---|
| 6,640,776 B2 | 11/2003 | Torii | |
| 6,834,639 B2 | 12/2004 | Torii | |
| 7,207,313 B2 | 4/2007 | Torii | |
| 2008/0209887 A1* | 9/2008 | Hanari | F02D 41/221 60/277 |
| 2009/0314074 A1* | 12/2009 | Davidkovich | G01M 15/042 73/114.79 |
| 2021/0125420 A1 | 4/2021 | Tabata et al. | |

FOREIGN PATENT DOCUMENTS

| | | |
|---|---|---|
| JP | 2002256894 A | 9/2002 |
| JP | 2017110525 A | 6/2017 |
| JP | 2021067594 A | 4/2021 |

* cited by examiner

*Primary Examiner* — Eric S. McCall
(74) *Attorney, Agent, or Firm* — CONLEY ROSE, P.C.

(57) ABSTRACT

A deterioration estimator for an electronic throttle device allows a throttle valve to be driven by a drive mechanism. The throttle valve is continuously operated to open and/or close. If operated to open, it opens from a first opening position, which is on a closed side from an opener opening position and in which the throttle valve is biased to an open side by an opener mechanism, to a second opening position, the second opening position being on an open side from the opener opening position with the throttle valve being biased to the closed side by the opener mechanism. If operated to close, the throttle valve is operated to close from the second opening position to the first opening position. A deteriorated condition of the electronic throttle device is estimated by detecting a behavior of the drive mechanism when the throttle valve passes by the opener opening position.

20 Claims, 15 Drawing Sheets

DETERIORATION ESTIMATOR FOR ELECTRONIC THROTTLE DEVICE

CROSS-REFERENCE TO RELATED APPLICATIONS

This application claims priority to Japanese patent application serial number 2021-205961, filed Dec. 20, 2021, which is hereby incorporated herein by reference in its entirety for all purposes.

BACKGROUND

The present disclosure relates to a deterioration estimator for an electronic throttle device.

In the case of products that are composed of combinations of a plurality of components, such as automobiles, components that run out of useful life may need to be replaced. On the other hand, even when a product is to be disposed of, it may be desirable from a resource conservation perspective that components having a remaining period of useful life at that point be recycled and reused.

SUMMARY

According to embodiments disclosed herein, a deteriorated condition of an electronic throttle device may be easily estimated while it is still mounted on a vehicle. More specifically, the electronic throttle device is configured to open and/or close a throttle valve by a drive mechanism. The behavior of the drive mechanism while the throttle valve is operating is detected, thereby allowing the system to detect a deteriorated condition of the electronic throttle device.

According to one aspect of the present disclosure, a throttle valve may be disposed in an intake passage of an internal combustion engine. The throttle valve is configured to adjust an amount of intake air to the internal combustion engine by adjusting its opening position. A drive mechanism adjusts the opening position of the throttle valve. A throttle opening sensor detects the opening position of the throttle valve. An opener mechanism biases the throttle valve to open to an opener opening position in which the valve is opened by a predetermined opening amount when the adjustment force applied to the throttle valve by the drive mechanism released. The opener mechanism biases the throttle valve toward an open side when an opening position of the throttle valve is on a closed side relative to the opener opening position. The opener mechanism biases the throttle valve toward a close side when an opening position of the throttle valve is on an open side relative to the opener opening position. A deterioration estimation circuit allows the throttle valve to be driven by the drive mechanism to continuously open from the closed side to the open side while passing over the opener opening position. Alternatively, the deterioration estimation circuit allows the throttle valve to continuously close from the open side to the closed side while passing over the opener opening position. The deterioration estimation circuit estimates a deteriorated condition of the electronic throttle device by detecting a behavior of the drive mechanism when the throttle valve passes by the opener opening position. Therefore, the deterioration estimation circuit is configured to estimate the deteriorated condition of the electronic throttle device while still being mounted on a vehicle.

According to another aspect of the present disclosure, the drive mechanism includes a motor as a drive source and a throttle gear configured to open and close the throttle valve. A motor gear is provided on an output shaft of the motor. An intermediate gear is provided between and meshes with the throttle gear and the motor gear. A biasing direction of the opener mechanism switches when passing by the opener opening position while the throttle valve is operated to open or close. An idling time occurs during which the intermediate gear idles relative to the throttle gear while the biasing direction is switched. For example, during the idling time, the intermediate gear rotates but does not rotate the throttle gear. The deterioration estimation circuit estimates a deteriorated condition of the electronic throttle device based on the idling time of the intermediate gear. In particular, the deterioration estimation circuit can estimate a level of wear of the intermediate gear based on a length of the idling time of the intermediate gear.

According to another aspect of the present disclosure, the idling time of the intermediate gear is determined by a time at which an opening operation speed or a closing operation speed of the throttle valve becomes continuously lower than the predetermined value. The idling time can be easily determined from signals detected by the throttle opening sensor.

According to another aspect of the present disclosure, the idling time of the intermediate gear is determined based on time data excluding time data shorter than a predetermined lower limit period of time. For example, the idling time may not be properly measured due to fluctuations in signals from the throttle opening sensor. The idling time of the intermediate gear can be determined with less error when only normal time data, excluding short-time abnormal data, is generated and used.

According to another aspect of the present disclosure, a currently measured value longer than an initial idling time is used. This data excludes an abnormal value in which the currently measured value of the idling time of the intermediate gear is shorter than the initial idling time determined at the time when the electronic throttle device was started being used. This proper, currently measured value is used as the idling time of the intermediate gear. Therefore, it is possible to determine the idling time of the intermediate gear with less error.

According to another aspect of the present disclosure, an idling time difference is used as the idling time of the intermediate gear. The idling time difference is determined by subtracting the initial idling time at the time when the electronic throttle device started being used from the currently measured value of the idling time. Therefore, only the time increased due to wear of the intermediate gear is determined and used to estimate the deterioration of the electronic throttle device.

According to another aspect of the present disclosure, the idling time of the intermediate gear is determined by using an average value of multiple idling time measurement results. Therefore, variations in each measurement can be suppressed such that the level of wear of the intermediate gear can be stably estimated.

According to another aspect of the present disclosure, the deterioration estimation circuit is activated after the internal combustion engine, on which the electronic throttle device is connected, has stopped. Therefore, an estimation process can be stably performed. For instance, there will be a sufficient processing capacity of a control circuit of the internal combustion engine when the internal combustion engine has stopped. Thus, when the same control circuit is to be used as a deterioration estimation circuit, a sampling rate of the throttle opening sensor signals in the deterioration estimation circuit can be made more detailed. Further, the deteriorated condition of the electronic throttle device is estimated while an accelerator pedal is not being operated. Thus, the estimation process can be performed without being affected by the operation of the accelerator pedal. Further, the estimation process can be performed with high accuracy without being affected by external disturbances, such as vibration or heat of the internal combustion engine.

According to another aspect of the present disclosure, a throttle valve open operation unit of the deterioration estimation circuit is configured to continuously operate the throttle valve to open by driving the drive mechanism from a closed side to an open side with the opener opening position as a passing point. A throttle valve close operation unit is configured to continuously operate the throttle valve to close by driving the drive mechanism from the open side to the closed side with the opener opening position as a passing point. An open operation behavior detecting unit allows the throttle valve to be operated to open by the throttle valve open operation unit to detect the behavior of the drive mechanism when the throttle valve passes by the opener opening position. A close operation behavior detecting unit allows the throttle valve to be operated to close by the throttle valve close operation unit to detect the behavior of the drive mechanism when the throttle valve passes by the opener opening position. An identification unit compares each signal detected by the open operation behavior detecting unit and the close operation behavior detecting unit. This enables the system to identify on which side of the drive mechanism the deteriorated condition has advanced more—the side where the throttle valve is operated to open from the opener opening position or the side where the throttle valve is operated to close from the opener opening position.

According to the foregoing devices and methods, it is possible to select an electronic throttle device that meets the needs of a user even when the electronic throttle device is a used and/or rebuild product. For example, a rebuilt product with a side of the corresponding drive mechanism operated to close from the opener opening position being deteriorated more can be provided for a user who more often uses the open side from the opener opening position. On the other hand, a rebuilt product with a side of the corresponding drive mechanism operated to open from the opener opening position being deteriorated more can be provided for a user who more often uses the closed side from the opener opening position. By doing so, the deteriorated electronic throttle device can be more effectively utilized as a rebuilt product.

According to another aspect of the present disclosure, the open operation behavior detecting unit and the close operation behavior detecting unit detect the behavior of the drive mechanism based on the magnitude of variation in the driving current for the drive mechanism. Accordingly, detection can be performed without using any special sensor.

DETAILED DESCRIPTION

An electronic throttle device is one of the important safety components among automobile components, and is manufactured so as to have relatively high reliability. Thus, the electronic throttle device is a component that has a relatively long useful service life among automobile components. It is desirable to recycle the electronic throttle device for continued use even when the corresponding automobile is to be scrapped. To facilitate use of the electronic throttle device for a long period of time, it may be beneficial to easily detect its deteriorated condition. However, there is currently no device available to detect the deteriorated condition of an electronic throttle device. Accordingly, embodiments described herein are directed to devices and methods for detecting the deterioration condition of an electronic throttle device.

Figure 1:
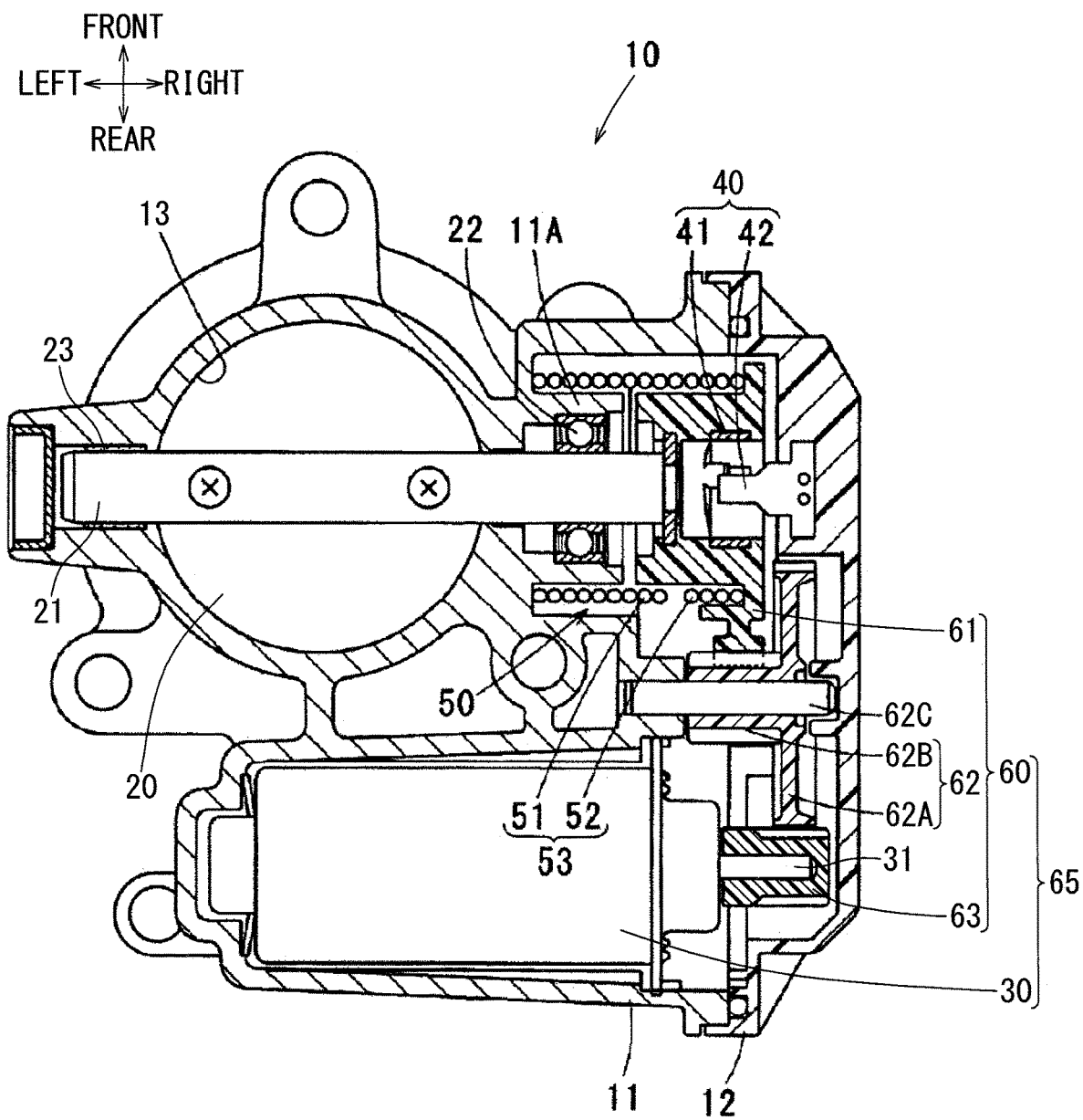
FIG. 1 is a cross-sectional view of an electronic throttle device according to a first embodiment.
Figure 2:
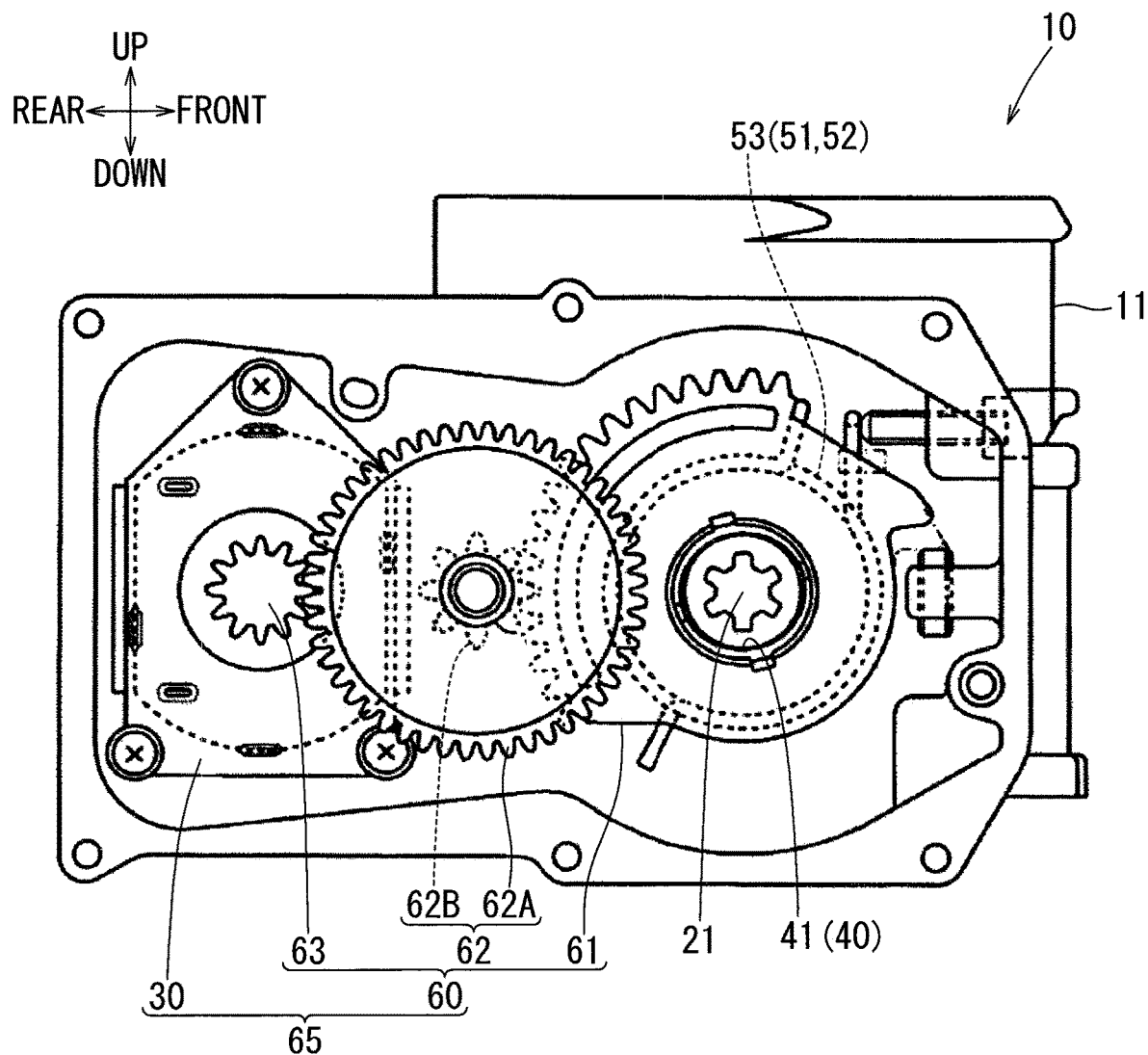
FIG. 2 is a side view of the electronic throttle device of FIG. 1 with the cover removed.

FIGS. 1 and 2 show one example of an electronic throttle device 10. The deterioration of the electronic throttle device 10 can be estimated using a deterioration estimator according to a first embodiment. The electronic throttle device 10 in this embodiment is a known one including a throttle body 11 made of die-cast aluminum. The throttle device 10 also includes a throttle valve 20 and a motor 30. The throttle valve 20 is configured to open and close a throttle passage 13 extending through the throttle body 11. The throttle passage 13 defines part of an intake passage of an internal combustion engine. The electronic throttle device 10 includes a throttle shaft 21 integrally formed with the throttle valve 20. The throttle shaft 21 is made to be that is rotatable in both directions relative to the throttle body 11 and is supported by the throttle body 11 via bearings 22, 23 provided at both ends of the throttle shaft 21. Upon rotation of the throttle shaft 21, the throttle valve 20 is opened or closed to adjust an amount of intake air supplied to the internal combustion engine via the corresponding intake passage. The motor 30 is positioned adjacent to the throttle valve 20 and is arranged such that an output shaft 31 of the motor 30 is oriented parallel to the throttle shaft 21.

As shown in FIG. 1, the motor output shaft 31 and the throttle shaft 21 are coupled via a reduction gear mechanism 60. The rotation output of the motor 30 is reduced by the reduction gear mechanism 60. The motor 30 causes the throttle shaft 21 and the throttle valve 20 to rotate, thereby allowing the throttle valve 20 to open or close the throttle passage 13. Accordingly, an opening position of the throttle valve 20 can be adjusted upon rotation of the motor 30. The reduction gear mechanism 60 includes a throttle gear 61 coupled to the throttle shaft 21, a motor gear 63 coupled to the motor output shaft 31, and an intermediate gear 62 positioned between and meshing with both the throttle gear 61 and the motor gear 63. More specifically, the intermediate gear 62 includes an integrally formed large diameter gear 62A and small diameter gear 62B. The large diameter gear 62A meshes with the motor gear 63 while the small diameter gear 62B meshes with the throttle gear 61. The motor 30 and the reduction gear mechanism 60 form a drive mechanism 65 for adjusting the opening position of the throttle valve 20. A cover 12 is coupled to the throttle body 11 and covers the reduction gear mechanism 60.

As shown in FIG. 1, an opener mechanism 50 is provided between the throttle gear 61 and the throttle body 11. The opener mechanism 50 biases the throttle valve 20 such that the opening of the throttle valve 20 is opened by a predetermined amount or degree (hereinafter referred to as an "opener opening position") while the rotational driving force of the throttle valve 20 is released by the motor 30. FIG. 2 shows the state of the throttle valve 20 at the opener opening position. In this embodiment, the opener mechanism 50 includes an opener spring 53. The opener spring 53 includes an integrally formed first spring portion 51 and second spring portion 52. The first spring portion 51 biases the throttle valve 20 in a closing direction toward the opener opening position. The second spring portion 52 biases the throttle valve 20 in an opening direction toward the opener opening position. The opener mechanism 50 provides an opening sufficient to allow a vehicle to travel at the minimum speed when a function for adjusting the opening position of the throttle valve 20 by the motor 30 fails.

As shown in FIG. 1, a throttle opening sensor 40 is provided between the throttle gear 61 and the cover 12. The throttle opening sensor 40 includes a magnetic circuit 41 provided on an inner peripheral wall of a cylindrical throttle gear 61 and a Hall integrated circuit (IC) 42 provided on the cover 12. The Hall IC 42 extends toward the inner periphery of the throttle gear 61. Therefore, the throttle opening sensor 40 detects an opening position of the throttle valve 20 and outputs detected signals from the Hall IC 42.

As shown in FIG. 2, each of gears 61, 62, 63 of the reduction gear mechanism 60 is made of resin. Accordingly, the of the meshing parts of each of the gears 61, 62, 63 is more likely to wear due to long term use than other parts of the electronic throttle device 10. In particular, the small diameter gear 62B of the intermediate gear 62, which meshes with the throttle gear 61, is prone to wear. A reason for this is that the intermediate gear 62 is often formed of a material that is more easily worn than the throttle gear 61. For instance, the intermediate gear 62 may be made of a material in which a fluororesin is mixed in another resin.

Figure 3:
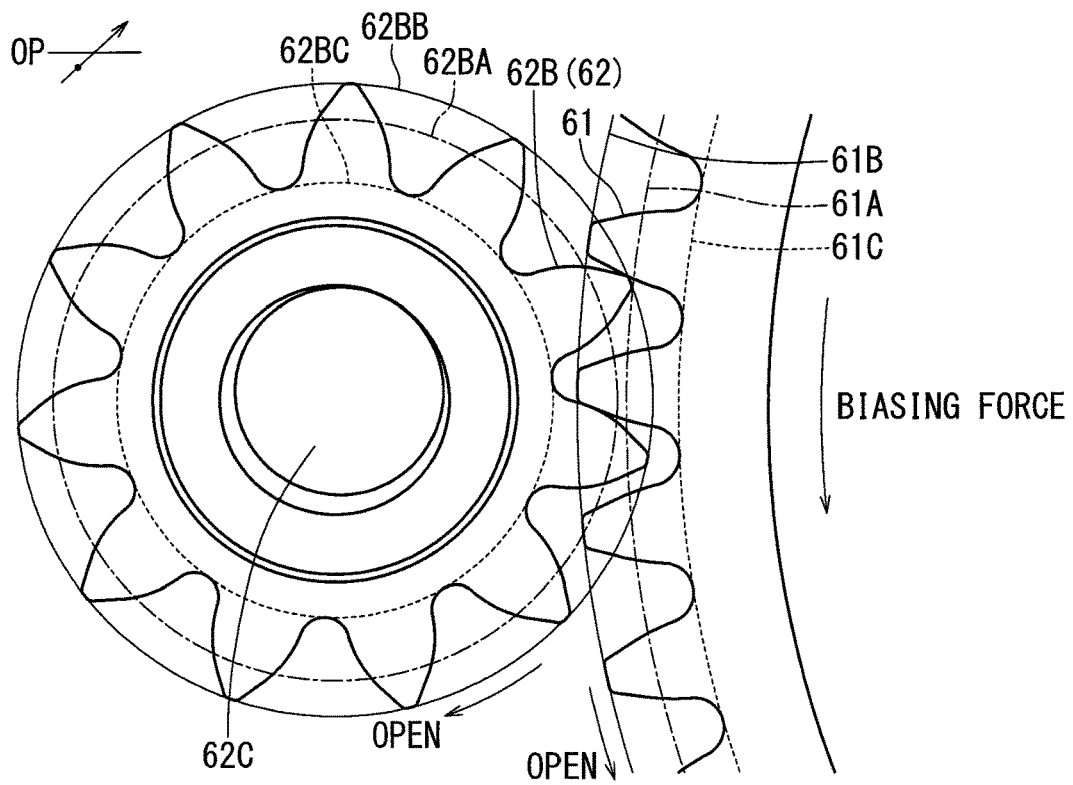
FIG. 3 is an enlarged partial view of the electronic throttle device illustrating the meshing relationship between the internal gear and the throttle gear while a throttle valve is operated to open on a closed side from an opener opening position.

FIG. 3 shows the small diameter gear 62B of the intermediate gear 62 and the throttle gear 61 of the throttle valve 20. The throttle valve 20 is provided on a closed side of the opener opening position OP. The symbol in the upper left corner of FIG. 3 includes an arrow pointing diagonally upward and to the right. The arrow indicates that the throttle valve 20 is being operated to move in an opening direction. The line intersecting the arrow in a horizontal direction indicates the opener opening position OP. As shown in FIG. 3, the black dot on the arrow indicates an opening position (current position) of the throttle valve 20 connected to the throttle gear 61. In the state shown in FIG. 3, the throttle opening position is on a closed side relative to the opener opening position OP.

The small diameter gear 62B of the intermediate gear 62 and the throttle gear 61 shown in FIG. 3 are rotated in the opening direction, which is indicated by arrows. At this time, the throttle gear 61 is driven to rotate by the small diameter gear 62B, which is driven to rotate by the motor 30. However, a biasing force is still being applied to the throttle gear 61 in a direction to open the throttle valve 20 by the opener spring 53 of the opener mechanism 50, as indicated by the biasing force arrow. Therefore, the throttle gear 61 actually rotates following the rotation of the small diameter gear 62B.

Figure 4:
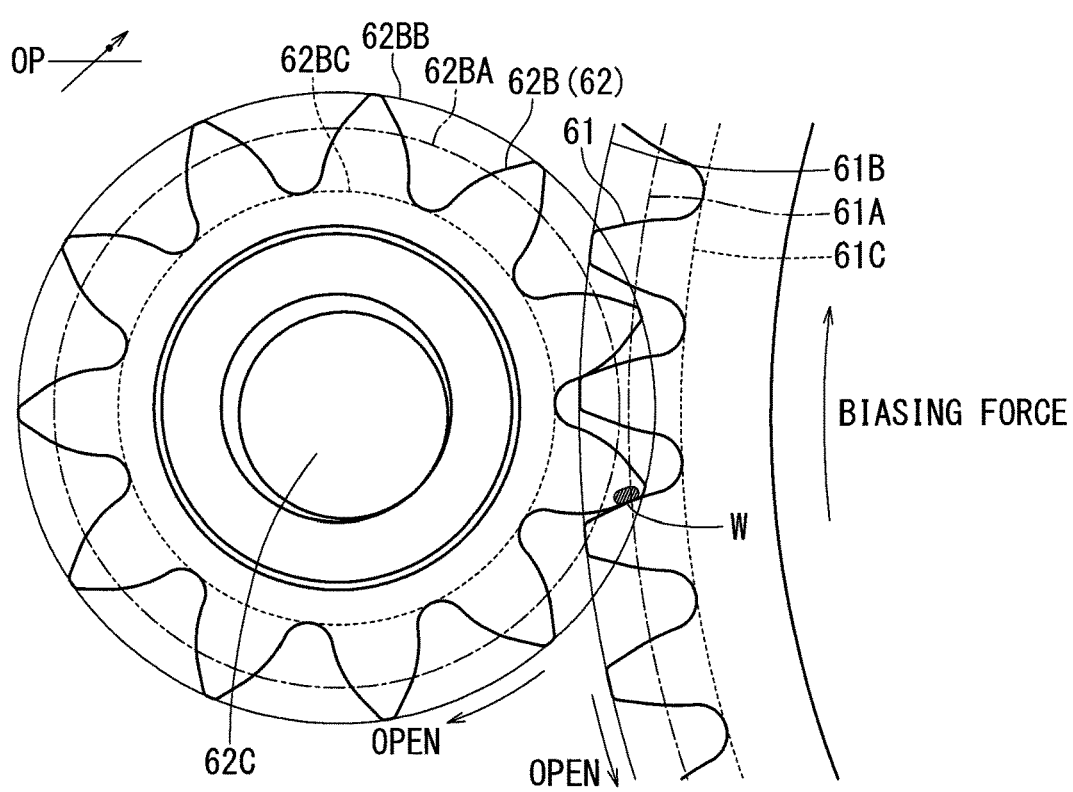
FIG. 4 is an enlarged partial view of the electronic throttle device similar to that of FIG. 3 and illustrating the meshing relationship between the internal gear and the throttle gear on an open side from the opener opening position.

Similar to FIG. 3, the symbol in the upper left corner of FIG. 4 shows a state in which the opening position of the throttle valve 20 has been moved to an open side relative the opener opening position OP while the throttle valve 20 is in the course of opening. The throttle valve 20 reaches the opener opening position OP prior to this point of time. When the throttle valve 20 is at the opener opening position OP, the biasing force due to the opener spring 53 is eliminated. Therefore, the throttle gear 61 stops rotating even though the small diameter gear 62B continues to rotate. That is, when passing over the opener opining position OP, the meshing state between the small diameter gear 62B and the throttle gear 61 switches from that shown in FIG. 3 to that shown in FIG. 4. After switching the meshing states, rotation of the throttle gear 61 by the small diameter gear 62B continues. At this time, the biasing force of the opener spring 53 switches from a direction indicated by the biasing force arrow in FIG. 3 to a direction indicated by the biasing force arrow in FIG. 4. As a result, the biasing force indicated by the arrow in FIG. 4 is in a closing direction of the throttle valve 20.

The small diameter gear 62B is loosely fitted to the intermediate gear shaft 62C. Therefore, as shown in FIGS. 3 and 4, the small diameter gear 62B shifts with respect to the intermediate gear shaft 62C, as compared with a desirable state (where the axes of the intermediate gear shaft 62C and the small diameter gear 62B are essentially coaxial), due to a reaction force generated when the small diameter gear 62B meshes with the throttle gear 61. As a result, the idling time of the small diameter gear 62B is further extended. For instance, a time in which the rotating small diameter gear 62B does not cause the throttle valve 20 to rotate is extended. FIGS. 3 and 4 show a pitch circle 61A, an addendum circle 61B, and a dedendum circle 61C of the throttle gear 61. FIGS. 3 and 4 also show a pitch circle 62BA, an addendum circle 62BB, and a dedendum circle 62BC of the small diameter gear 62B.

Referring to FIG. 4, during the idling time, the small diameter gear 62B rotates without rotating the throttle gear 61 when the throttle valve 20 passes through the opener opening position OP during an opening operation of the throttle valve 20. This idling time is extended when the small diameter gear 62B wears, as indicated by W in FIG. 4. For instance, the time in which the throttle gear 61 is not rotated by the small diameter gear 62B becomes lengthened.

Figure 5:
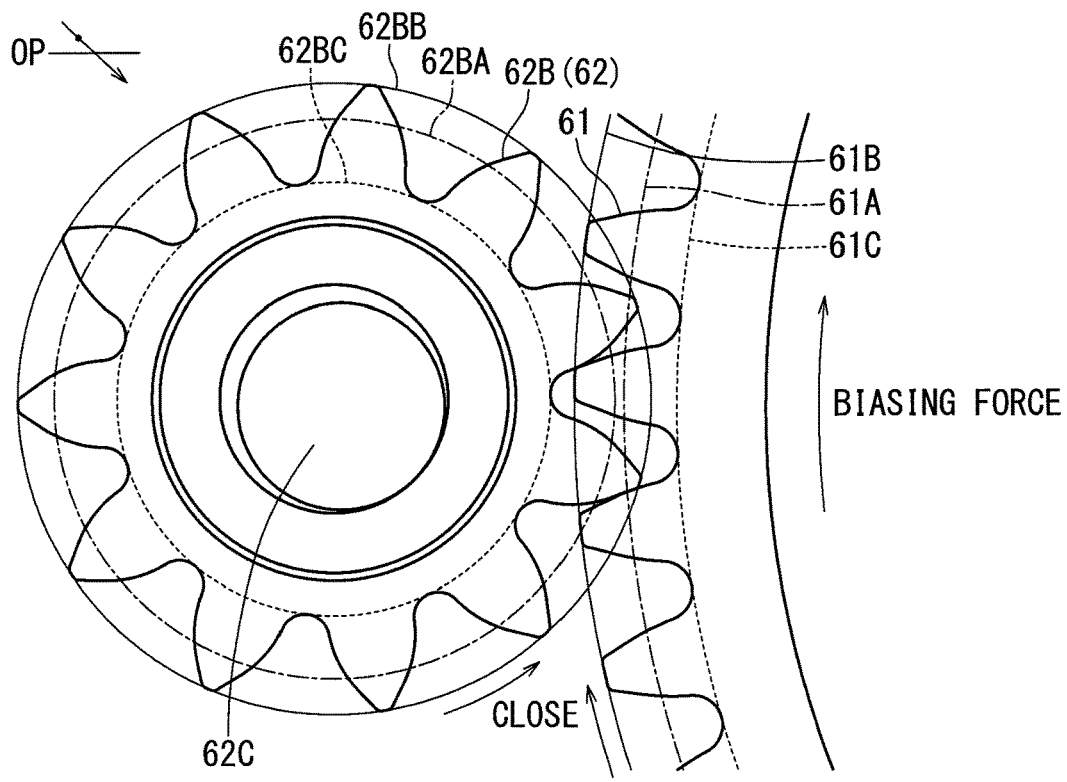
FIG. 5 is an enlarged partial view of an electronic throttle device illustrating the meshing relationship between the intermediate gear and the throttle gear while the throttle valve is operated to close on the open side from the opener opening position.

FIG. 5 includes a symbol in the upper left corner, similar to FIG. 3. The upper left symbol in FIG. 5 represents a state in which the throttle valve 20 is on the open side relative to the opener opening position OP. The throttle valve 20 is being operated to close. At this time, the small diameter gear 62B and the throttle gear 61 shown in FIG. 5 are rotated in a closing direction, as indicated by the arrows. More specifically, the throttle gear 61 is allowed to rotate due to the rotation of the small diameter gear 62B. However, a biasing force is exerted on the throttle gear 61, as indicated by the biasing force arrow, in a direction to close the throttle valve 20 by the opener spring 53 of the opener mechanism 50. Therefore, the throttle gear 61 actually rotates due to the rotation of the small diameter gear 62B.

Figure 6:
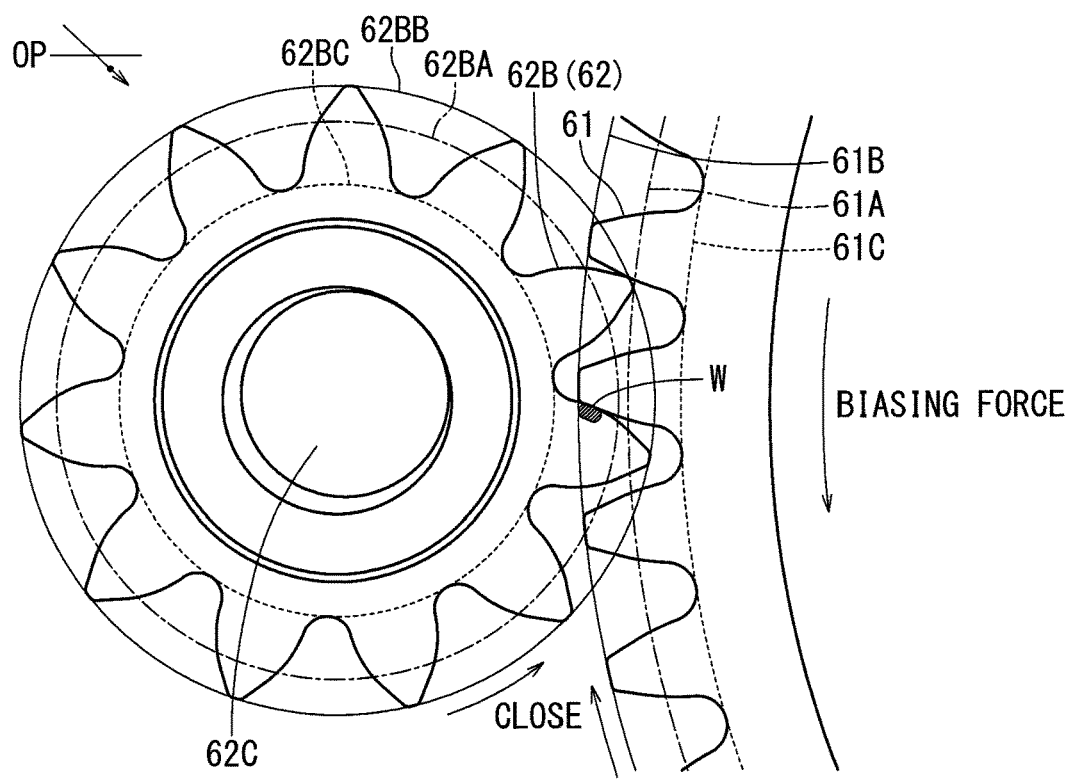
FIG. 6 is an enlarged partial view of a throttle valve similar to that of FIG. 5 and illustrating the meshing relationship between the intermediate gear and the throttle gear on the closed side from the opener opening position.

FIG. 6 shows a state in which the opening position of the throttle valve 20 is brought to a closed side relative to the opener opening position OP in the course of closing the throttle valve 20. Prior to this point of time, the throttle valve 20 reaches the opener opening position OP. When the throttle valve 20 is at the opener opening position OP, the biasing force acting on the throttle valve 20 by the opener spring 53 is eliminated. As a result, the throttle gear 61 stops rotating even though the small diameter gear 62B continues to rotate. That is, as shown in FIGS. 5 and 6, the meshing state between the small diameter gear 62B and the throttle gear 61 switches as the throttle valve 20 passes over the opener opening position OP. After passing over the opener opening position OP, rotation of the throttle gear 61 by the small diameter gear 62B continues. The biasing force by the opener spring 53 also switches to a direction to open the throttle valve 20, as can be seen from the biasing force arrow in FIG. 5 and the biasing force arrow in FIG. 6.

As show in FIGS. 5 and 6, the small diameter gear 62B shifts with respect to the intermediate gear shaft 62C, as compared with a desirable state (in which the axes of the intermediate gear shaft 62C and the small diameter gear 62B are essentially coaxial), due to a reaction force generated when the small diameter gear 62B meshes with the throttle gear 61. As a result, the idling time of the small diameter gear 62B is further extended.

Accordingly, the small diameter gear 62B does not rotate the throttle gear 61 when the throttle valve 20 passes through the opener opening position OP during a closing operation of the throttle valve 20. This idling time is extended as the small diameter gear 62B wears, as indicated by W in FIG. 6. For instance, the time in which the throttle gear 61 is not rotated by the small diameter gear 62B becomes lengthened.

Figure 7:
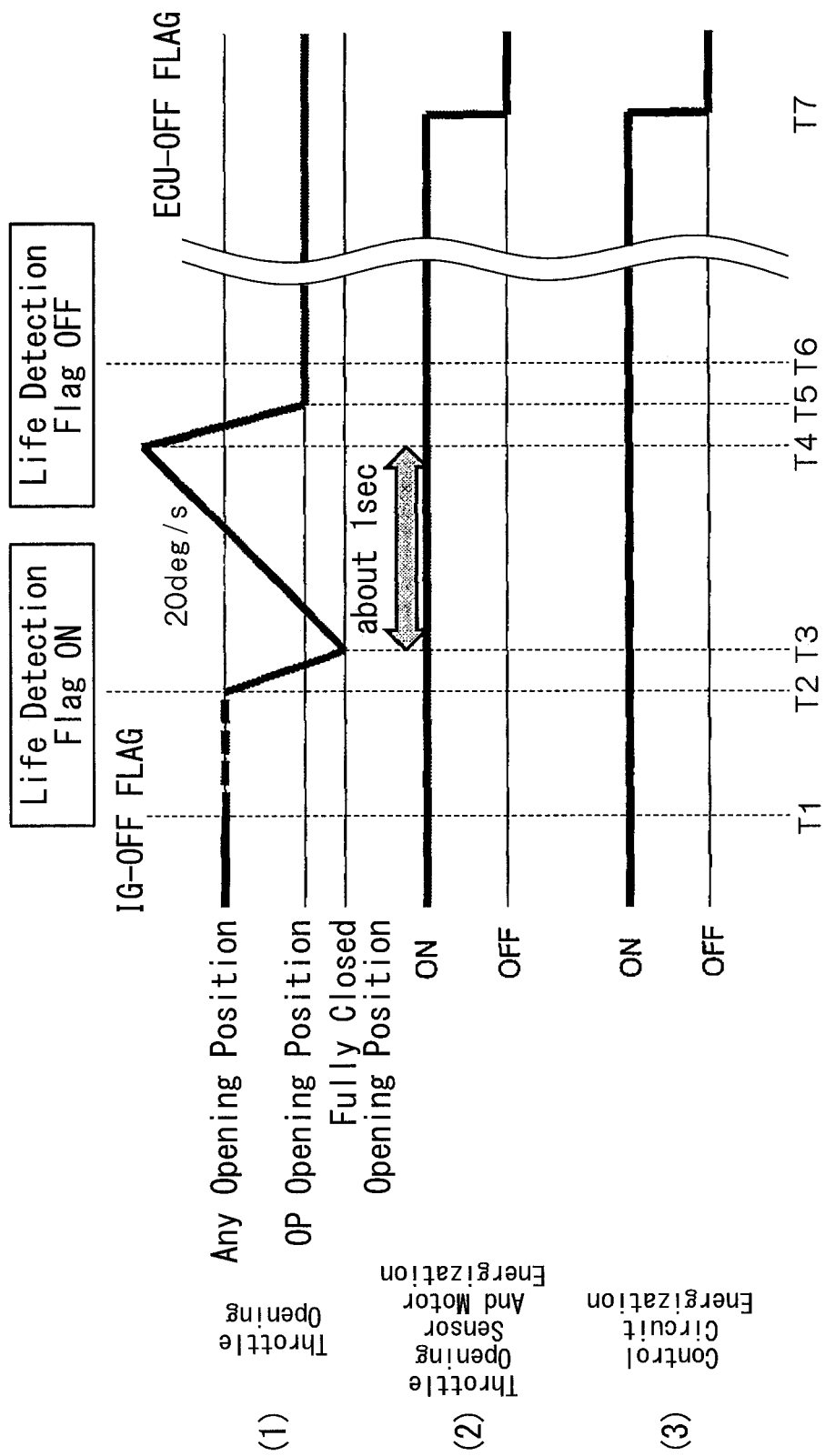
FIG. 7 is a time chart illustrating an operation state of a measuring mode according to a first embodiment.

FIG. 7 shows an overview of a first embodiment of an operation of the deterioration estimator of the electronic throttle device 10 mounted on the internal combustion engine. In the first embodiment, as shown in FIG. 7(1), the throttle opening is fully closed at a time corresponding to T3. This may be done after the internal combustion engine is stopped (e.g., at a time corresponding to T1). The throttle valve 20 is then operated to open over a predetermined period of time (e.g., 1 second, which corresponds to a time between times T3 and T4) at a predetermined speed (e.g., 20 degrees per second). Subsequently, a process to bring the throttle opening position to the opener opening position (OP opening position) (which is reached at a time corresponding to T5) is performed. Based on how the throttle valve 20 is operated to open (during the times corresponding to T3 and T4) as described above, a deteriorated condition of the electronic throttle device 10 is estimated. The details of an embodiment will be described in more detail below. As shown in FIGS. 7(2) and 7(3), even if the internal combustion engine has been stopped at Time T1, electric power may continue to be supplied to the throttle opening sensor 40, the motor 30, and the control circuit 70 (see FIG. 9). The electric power supply to the throttle opening sensor 40, the motor 30, and the control circuit 70 may be shut down at Time T7, at which time all processes associated with the operation of the internal combustion engine, including an estimation process of the deteriorated condition of the electronic throttle device 10, have come to an end. Even if the throttle valve 20 is opened during this time, the internal combustion engine will not be operated since fuel will not be supplied to the internal combustion engine after Time T1. The processes described with reference to FIG. 7 may be performed every time the internal combustion engine is stopped.

Figure 9:
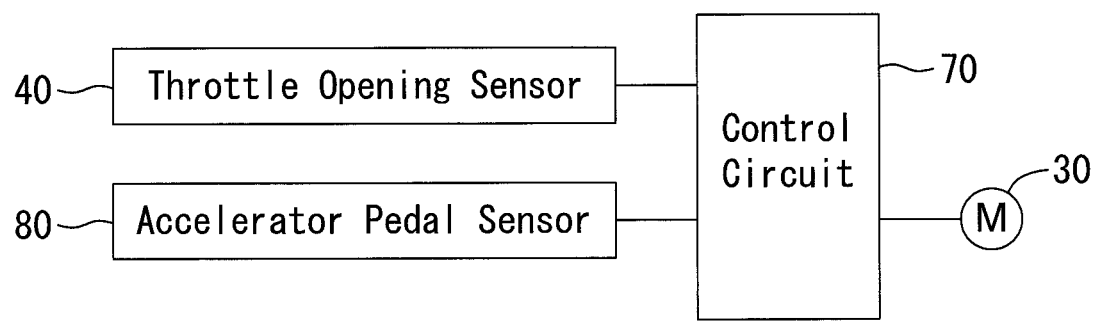
FIG. 9 is a block circuit diagram of a control circuit of the electronic throttle device according to the first embodiment.

FIG. 9 illustrates select components in communication with the control circuit 70 of the internal combustion engine (not shown). The control circuit 70 includes a stored computer program. Signals detected by the throttle opening sensor 40 of the electronic throttle device 10 and an accelerator pedal sensor 80 are input in the control circuit 70. The accelerator pedal sensor 80 detects an operation amount of an accelerator pedal (not shown) operated by a driver who is driving a vehicle. Additionally, the control circuit 70 receives signals detected by the throttle opening sensor 40 and the accelerator pedal sensor 80 to control the rotation of the motor 30 of the electronic throttle device 10. For instance, the motor 30 is driven to rotate in accordance with the operation amount of the accelerator pedal. The motor 30 stops rotating when the throttle opening sensor 40 detects that the throttle opening position corresponding to the operation amount of the accelerator pedal has been reached. The control circuit 70 is provided with a function to act as the deterioration estimator of the electronic throttle device 10.

Figure 8:
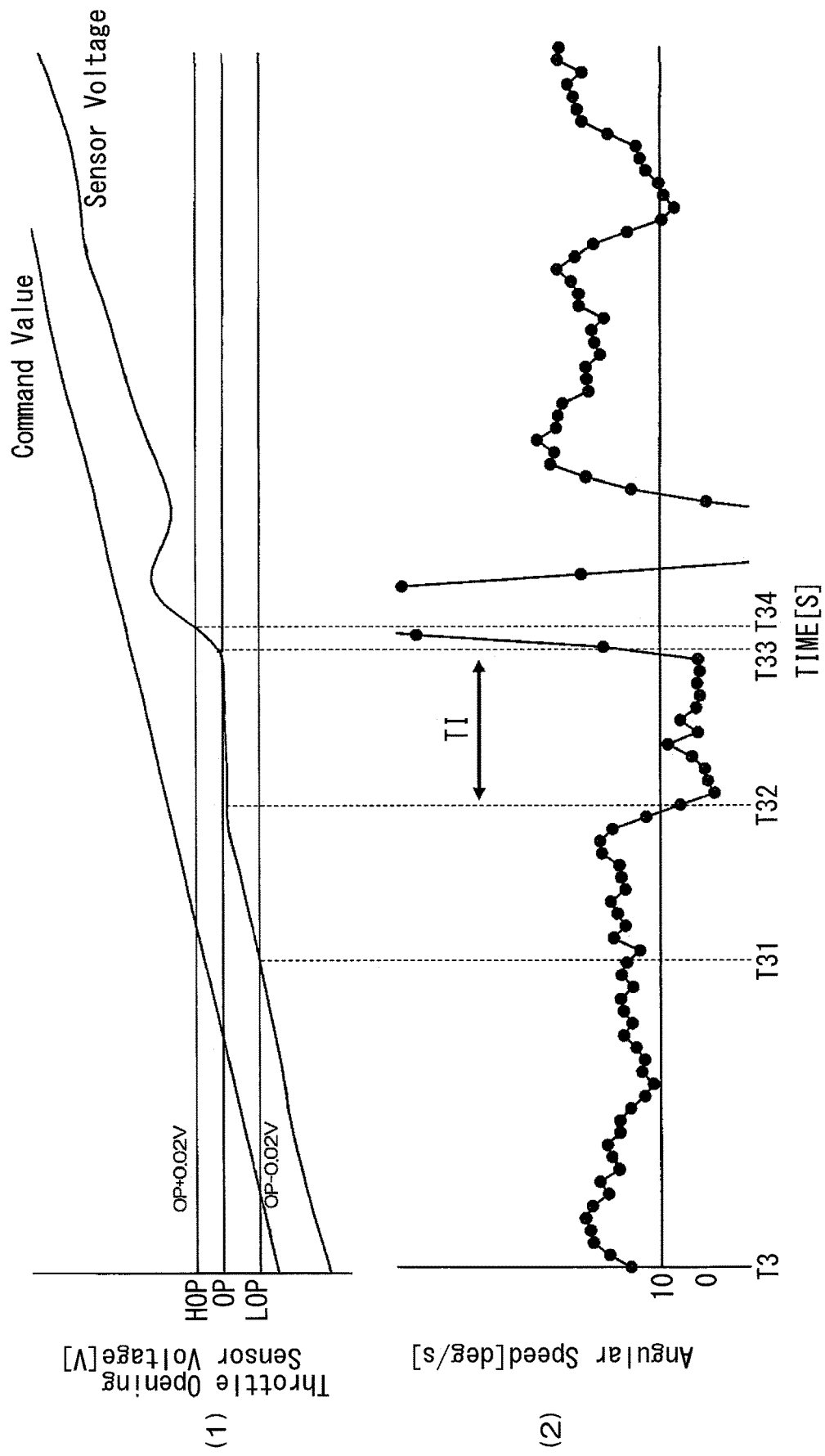
FIG. 8 is a time chart illustrating details of the measuring mode shown in FIG. 7.
Figure 10:
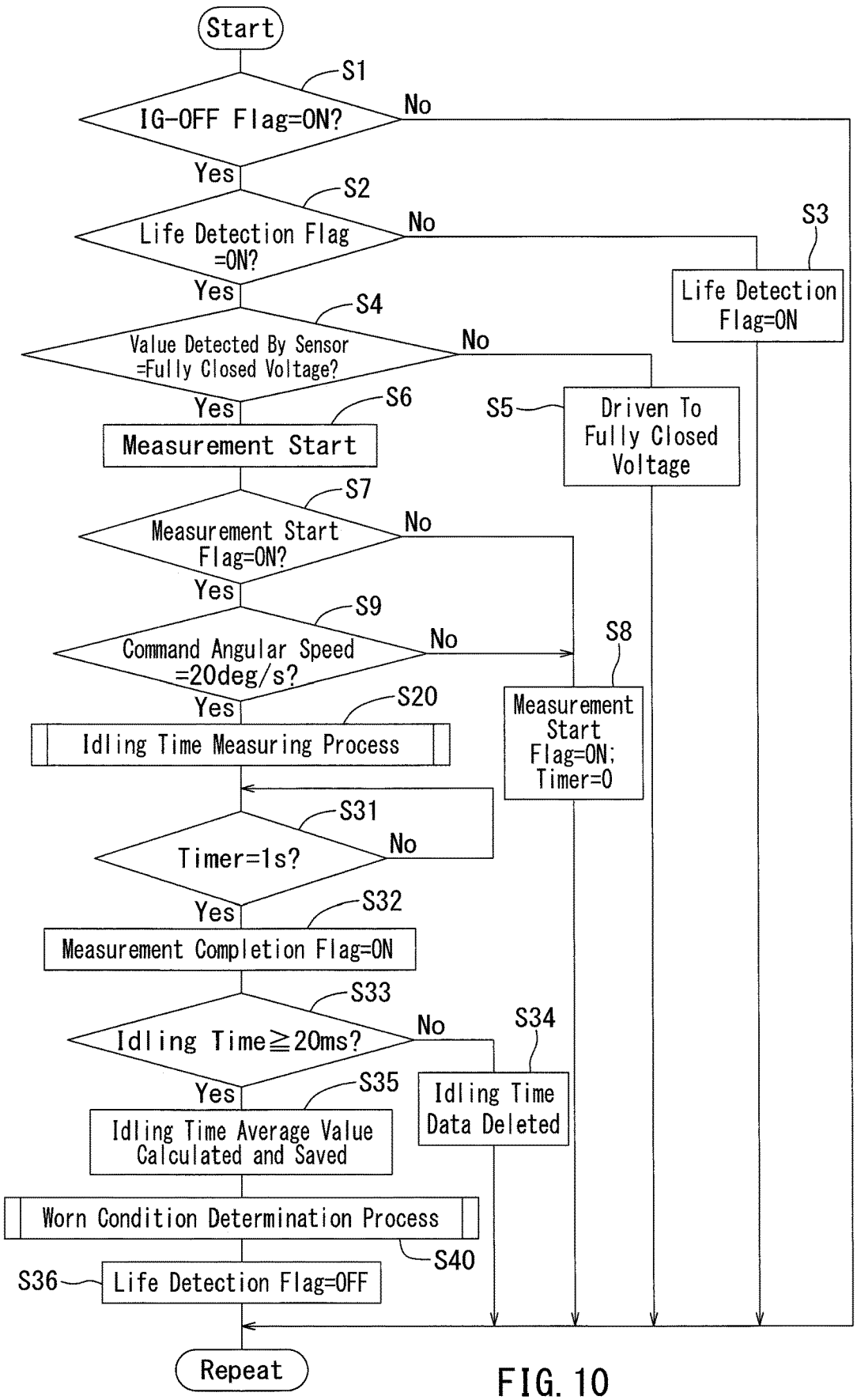
FIG. 10 is a flowchart illustrating control contents of the measuring mode of the control circuit.

FIG. 10 shows contents of a deterioration estimation program of the electronic throttle device 10, which may be implemented by the computer of the control circuit 70. When the internal combustion engine is instructed to stop, which occurs at Time T1 in FIG. 7, and the deterioration estimation program is implemented, it is determined whether or not an IG-OFF flag has been set to ON in Step S1. The IG-OFF flag is set to ON when an ignition switch is turned OFF to stop the internal combustion engine. Therefore, the IG-OFF flag is set at Time T1. If Step S1 is determined as positive, the process proceeds to Step S2. In Step S2, it is determined whether or not a life detection flag has been set to ON. If the life detection flag has been set to OFF, Step S2 is determined as negative. In such a case, the life detection flag is set to ON in Step S3 (which occurs at Time T2 in FIG. 7). If the life detection flag is set to ON, the detection (estimation) of the deteriorated condition of the electronic throttle device 10 becomes ready to start. If Step S2 is determined as positive, it is determined whether or not the throttle opening sensor 40 is outputting a throttle opening fully closed signal. Since the throttle opening is initially not fully closed, Step S4 is determined as negative. Then, in Step S5, the motor 30 is actuated to fully close the throttle opening (which is completed at Time T3 in FIG. 7). As described-above, Step S4 is determined as positive when the throttle opening is detected as being fully closed. The deterioration estimation process (measurement of idling time) is then started in Step S6. Here, the start timing corresponds to Time T3 in FIGS. 7 and 8. At Time T3, the throttle valve 20 starts to open at a rate of 20 degrees per second. FIGS. 8(1) and 8(2) show the detected signals by the throttle opening sensor 40 after T3 of FIG. 7 and the angular speed signals obtained by differentiating the detected signals, respectively.

In Step S7 of FIG. 10, it is determined whether the measurement start flag has been set to ON. If the measurement start flag is not set to the ON state, Step S7 is determined to be negative. In Step S8, the measurement start flag is set to ON. A throttle operation time is reset to "0" to start measurement of the throttle operation timer. After the measurement start flag is detected as having been set to ON, Step S7 is determined to be positive. In Step S9, it is determined whether or not a command speed for an opening operation of the throttle valve 20 is at 20 degrees per second. If the command speed is not at 20 degrees per second, Step S9 is determined to be negative, such that the operation of Step S8 as described above is performed. When the command speed (command angular speed) reaches 20 degrees per second, Step S9 is determined to be positive. In Step S20, an idling time measuring process is performed.

Figure 11:
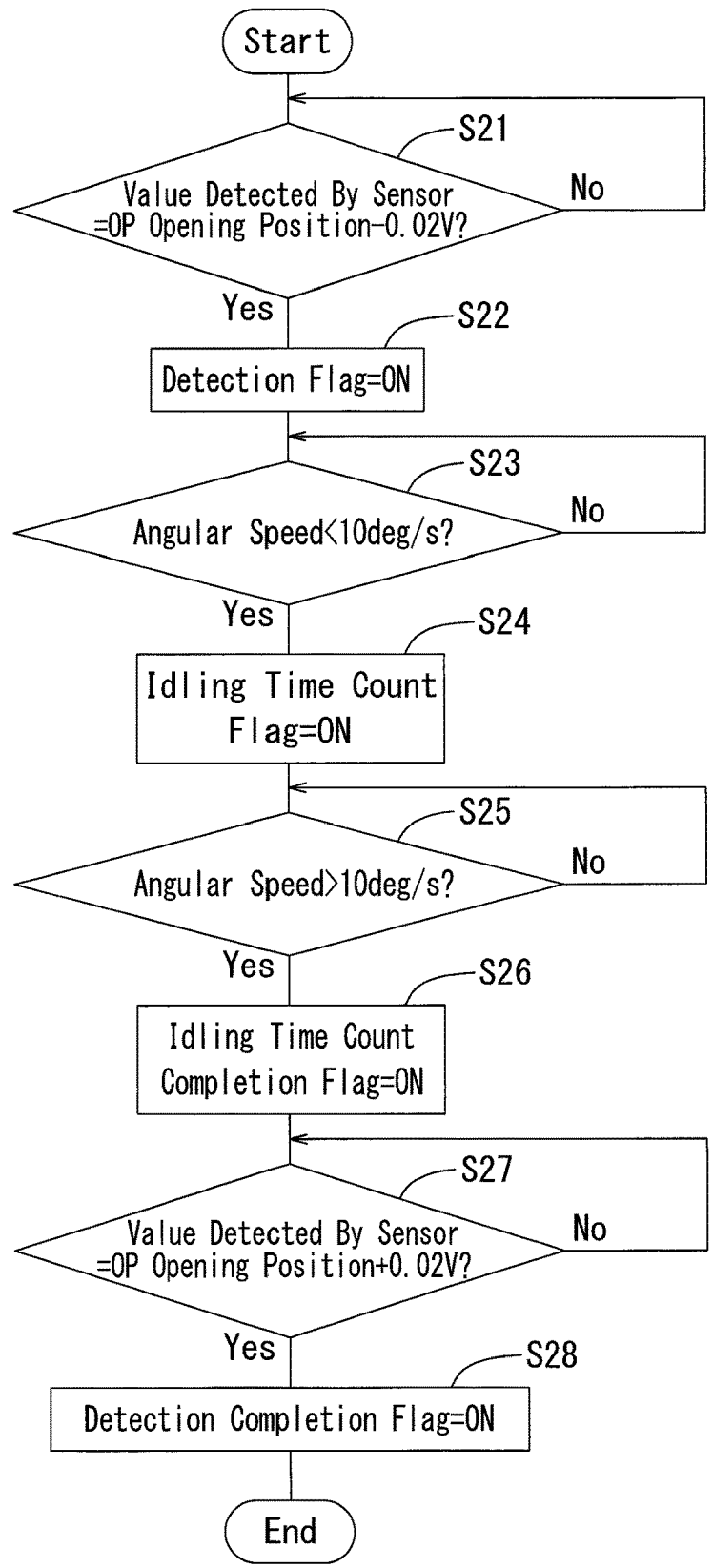
FIG. 11 is a flowchart illustrating an idling time measuring operation of the measuring mode.

When Step S20 in FIG. 10 is performed, it is determined whether or not the value detected by the throttle opening sensor 40 has reached a certain opening position LOP value, for example in Step S21 of FIG. 11. This opening position LOP value may be preset before performing Step S21 and may be set at a value lower than the opener opening position OP. The opening position LOP is a value detected by the throttle opening sensor 40 and is represented by an opening position value of −0.02V in FIG. 8. The value detected by the throttle opening sensor 40 reaches the desired opening position LOP at Time T31 in FIG. 8. In this case, Step S21 is determined to be positive. In Step S22, a detection flag is set to ON. When the detection flag is set to ON, a timer for measuring the idling time has already become ready for measuring. Next, in Step S23, it is determined whether or not the angular speed of the throttle valve 20, which may be obtained by differentiating the detected signals detected by the throttle opening sensor 40, is lower than 10 degrees per second. That is, it is here determined whether or not the opening operation speed of the throttle valve 20 is lower than a predetermined value. For example, it is determined whether the opening of the throttle valve 20 has slowed or stopped. For example, at Time T32 in FIG. 8, the angular speed of the throttle valve 20 is detected as being lower than 10 degrees per second. In this case, Step S23 is determined to be positive and an idling time count flag is set to ON in Step S24. When the idling time count flag is detected as having been set to ON, the timer for measuring the idling time starts to count. The rotation of the throttle gear 61 stops during the idling time. The duration of the idling time, during which the small diameter gear 62B of the intermediate gear 62 is still moving, is measured. The idling of the small diameter gear 62B, which may be a time in which the small diameter gear 62B does not rotate the throttle gear 61, is detected as a behavior of the drive mechanism.

Next, in Step S25 of FIG. 11, it is determined whether or not the angular speed of the throttle valve 20 is higher than 10 degrees per second. For example, the angular speed becomes higher than 10 degrees per second at Time T33 in FIG. 8. In this case, Step S25 is determined to be positive. An idling time count completion flag is then set to ON in Step S26. After the idling time count completion flag has been set to ON, the timer for measuring the idling time stops counting. Therefore, the timer for measuring the idling time measures a period of time during which the angular speed of the throttle valve 20 is lower than 10 degrees per second (which corresponds to T1 in FIG. 8). This period of time generally corresponds to the period of time during which the meshing between the intermediate gear 62 and the throttle gear 61 changes while the throttle valve 20 is in the course of being opened by the motor 30. During this period of time, the intermediate gear 62 does not apply a strong enough force on the throttle gear 61 to move the throttle gear 61 form the opener opening position. Accordingly, the rotation of the throttle gear 61 temporarily stops (FIGS. 3 and 4).

In Step S27 of FIG. 11, it is determined whether or not the value detected by the throttle opening sensor 40 has passed the opener opening position OP, for example by detecting whether it has reached a preset opening position HOP. This opening position HOP is determined by a value detected by the throttle opening sensor 40 and is represented by an opening position detected value of +0.02V in FIG. 8. The value detected by the throttle opening sensor 40 reaches this opening position HOP at Time T34 in FIG. 8. In this case, Step S27 is determined to be positive and a detection completion flag is set to ON in Step S28. After the detection completion flag has been set to ON, the timer for measuring the idling time stops operating. Thereafter, the idling time measuring process of Step 20 of FIG. 10 ends.

In Step S31 of FIG. 10, it is determined whether or not a period of time measured by a throttle operation timer has reached a preset period of time, for example 1 second. When the period of time measured by the throttle operation timer has reached the preset period of time, Step S31 is determined to be positive, and a measurement completion flag is set to ON in Step S32. After the measurement completion flag has been set to ON, the throttle operation timer stops operating.

Figure 13:
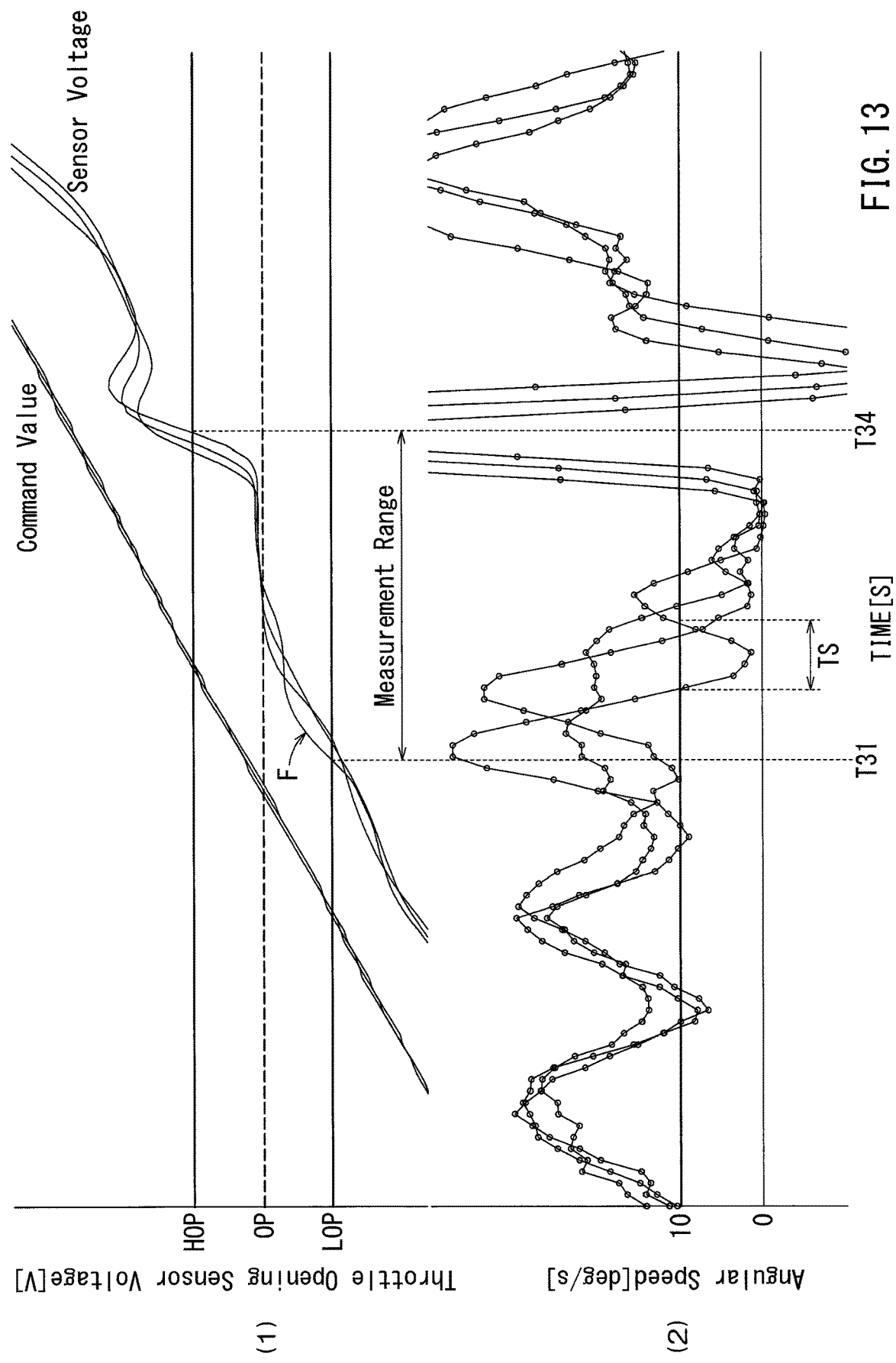
FIG. 13 is a time chart similar to FIG. 8 showing variations for every measurement.

In Step S33 of FIG. 10, it is determined whether or not the idling time measured by the idling time measurement process in Step S20 is greater than or equal to a lower limit period of time, e.g., 20 milliseconds. If the idling time is smaller than this lower limit period of time, Step S33 is determined to be negative. Accordingly, in Step S34, the idling time data thereof is deleted. This process excludes data that is apparently incorrect for the idling time. As described above, the idling time is measured when the angular speed of the throttle valve 20 is lower than 10 degrees per second. However, if "fluctuations" are contained in the detected signals of the throttle opening sensor 40, it is possible that an abnormally short period of time may be detected as the idling time. FIG. 13 shows how the idling time could be measured, similar to FIG. 8. "Fluctuations," indicated by "F," are contained in the detected signals of the throttle opening sensor 40, as seen in FIG. 13(1). In FIG. 13, the time between T31 and T34 is a measurement range over which the detection flag could have been set to ON. In this case, as indicated by "TS" in FIG. 13(2), the angular speed of the throttle valve 20 may be detected as being lower than 10 degrees per second at a point in time that is not actually the idling time. Therefore, a period of time affected by the "fluctuations" may be erroneously detected as the idling time. Such erroneously detected data are removed in processes of Steps S33 and S34.

If the idling time is longer than or equal to the lower limit period of time, Step S33 of FIG. 10 is determined to be positive. Data corresponding to the idling time is then saved in Step S35. In some embodiments, the idling time over a preset number of measurements (e.g., 20 times) may be determined and saved as the idling time in Step S35. Next, in Step S40, a worn condition determination process of the intermediate gear 62 is implemented.

Figure 12:
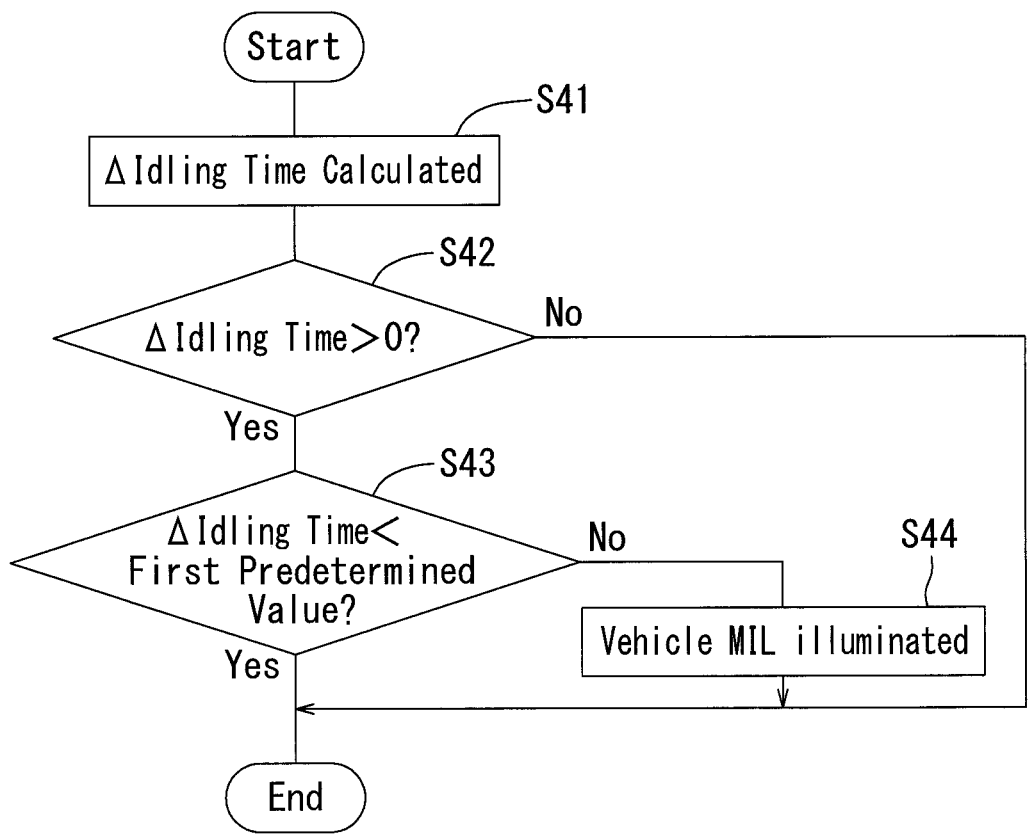
FIG. 12 is a flowchart illustrating a friction determination operation of the measuring mode.

When Step S40 is implemented, a change in idling time (Δ idling time) is calculated in Step S41 in FIG. 12. The Δ idling time is a value obtained by subtracting an initial idling time, which was determined and saved at an initial stage when the electronic throttle device 10 started being used, from the idling time saved in the above-described Step S35 (currently measured or averaged value). In Step S42, it is determined whether or not the Δ idling time is greater than 0. A Δ idling time smaller than 0 means that the idling time at the current period of time is shorter than that at the initial stage when the electronic throttle device 10 started being used. As the wear of the intermediate gear 62 advances, the idling time should become longer. Therefore, a Δ idling time smaller than 0 is apparently incorrect data (abnormal value). Thus, such incorrect data will not be not used. Step S42 is determined as positive only when the Δ idling time is greater than 0. Next, in Step S43, it is determined whether or not the Δ idling time is smaller than a preset first predetermined value. If the Δ idling time is greater than or equal to the first predetermined value, Step S43 is determined to be negative. In Step S44, a warning lamp (MIL) is illuminated. More specifically, it is determined whether the idling time has become longer than a certain limit, the idling timing typically increasing as the wear of the intermediate gear 62 advances. In this case, the warning lamp is illuminated to warn the user of the deteriorated condition of the electronic throttle device 10. On the other hand, if the Δ idling time is smaller than the first predetermined value, Step S43 is determined to be positive. In either event, the worn condition determination process of Step S40 then ends.

Afterwards, in Step S36 of FIG. 10, the life detection flag is reset by setting it to OFF (which occurs at Time T6 in FIG. 7). Consequently, the end of the detection (estimation) of the deteriorated condition of the electronic throttle device 10 is recorded.

By the above-described process of FIG. 10, the length of time the opening speed of the throttle valve 20 is lower is measured as the idling time of the intermediate gear 62 or of the throttle gear 61. The worn condition of the intermediate gear 62 is estimated according to the length of the idling time. That is, in this embodiment, the deteriorated condition of the electronic throttle device 10 is estimated using the idling time. This process can be implemented while the throttle device 10 is still mounted on a vehicle and without it being removed from the internal combustion engine.

Figure 14:
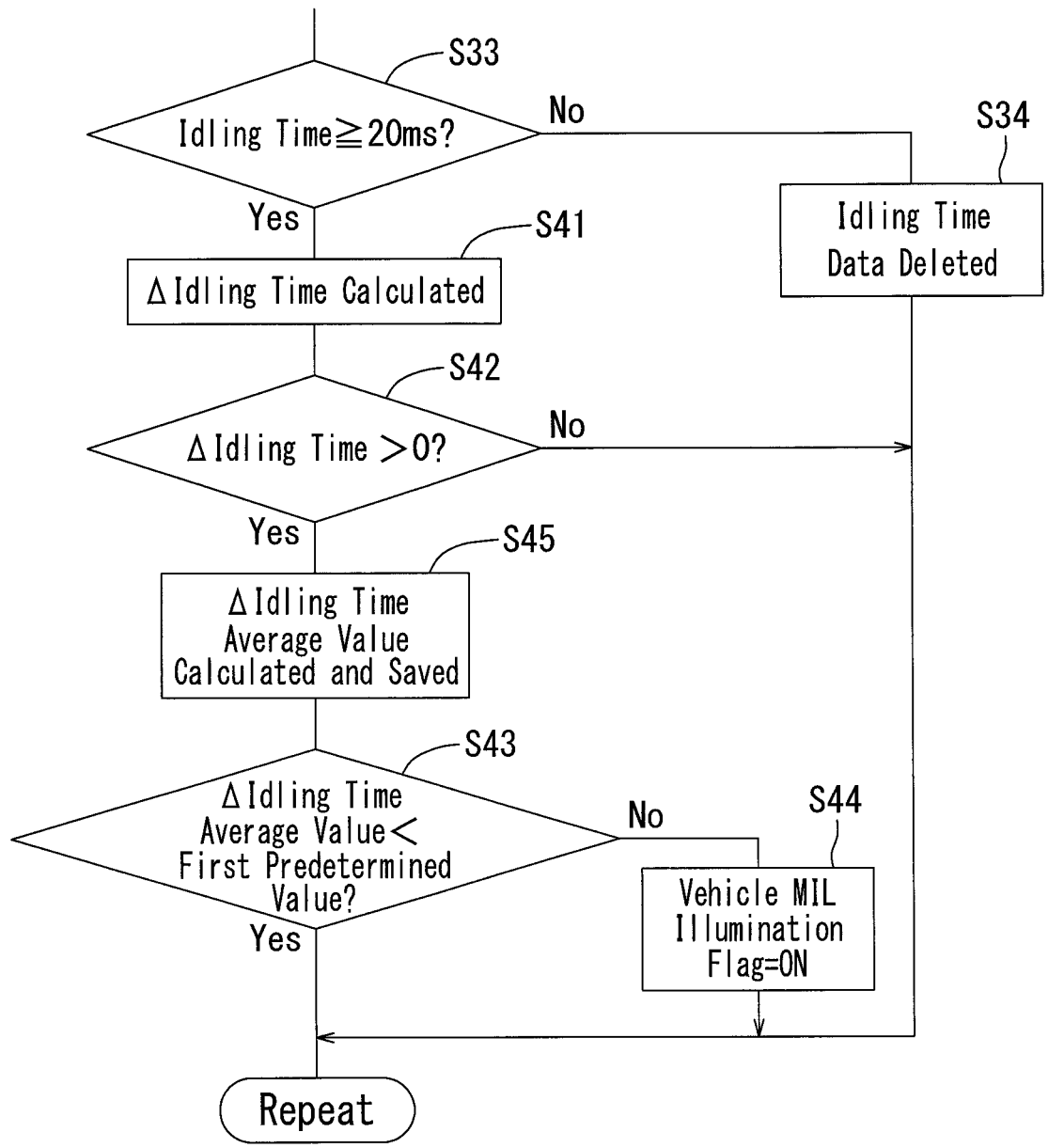
FIG. 14 is a flowchart illustrating a modified portion of the flowchart of FIG. 10 according to a second embodiment.

FIG. 14 shows a second embodiment. A distinction between the second embodiment and the above-described first embodiment is that a method of the processes of the worn condition determination process are different. Other configurations are essentially identical in both embodiments, and repetition of the description of similar parts will be omitted.

In Step S33 of FIG. 14, it is determined whether or not the measured idling time is greater than or equal to the preset lower limit period of time, e.g. 20 milliseconds. If the idling time is less than the lower limit period of time, Step S33 is determined to be negative, and accordingly the idling time data will be deleted in Step S34. Up to this point, the second embodiment is essentially identical to the first embodiment. In the second embodiment, if the idling time is determined to be greater than or equal to the lower limit period of time, Step S33 is determined to be positive, and the Δ idling time will be calculated in a similar fashion as that described above in reference to Step S41. Next, in Step S42, it is determined whether or not the Δ idling time is greater than 0. If the Δ idling time is smaller than 0, similar to the case of the first embodiment, Step S42 is determined to be negative, and such incorrect data will not be used. If the Δ idling time is greater than 0, Step S42 is determined to be positive. In Step S45, the average value of the Δ idling time of a preset number of measurements is calculated and saved.

If the average value of the Δ idling time is determined to be greater than or equal to a first predetermined value in Step S43, the warning lamp (MIL) will be illuminated in Step S44 and the worn condition determination process ends. The worn condition determination process ends without illuminating the warning lamp (MIL) if the Δ idling time is determined to be smaller than the first predetermined value in Step S43.

In the first embodiment, a current idling time (or an average of idling times) is used to calculate a Δ idling time to be used for the comparison with the first predetermined value. On the other hand, in the second embodiment, the average value of the Δ idling times is used for the comparison with the first predetermined value to determine the worn condition.

Figure 15:
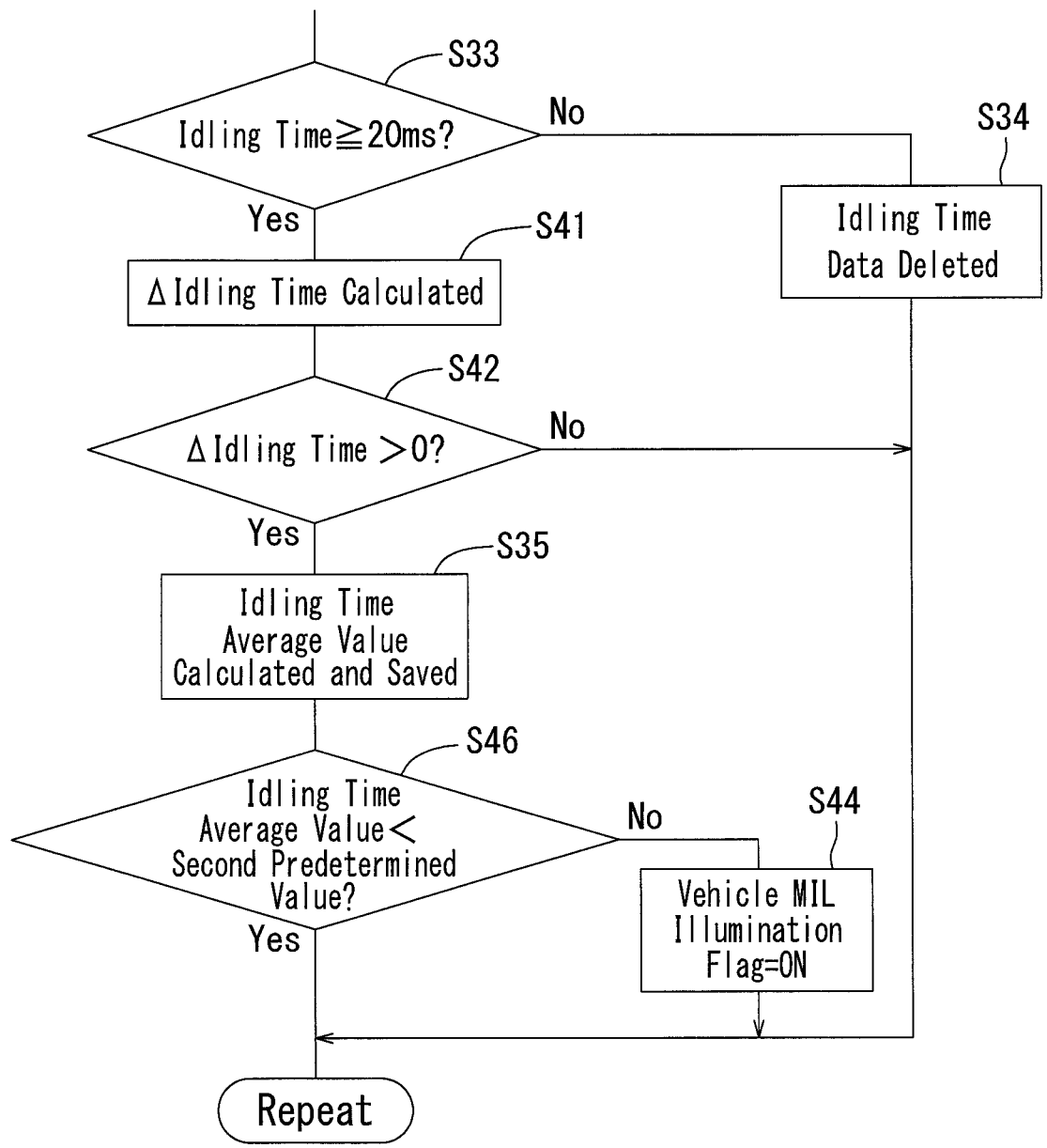
FIG. 15 is a flowchart illustrating a modified portion of the flowchart of FIG. 10 according to a third embodiment.

FIG. 15 shows a third embodiment. A distinction between the third embodiment and the above-described second embodiment (see FIG. 14) is that a method of determining the worn condition using the determined running time data has changed. Other configurations are essentially identical in both embodiments, and repetition of the description of these similar parts will be omitted.

In FIG. 15, the processes other than the processes of Step S35 and Step S46 are essentially identical to those of the second embodiment shown FIG. 14. In Step S35 of the third embodiment, the average value of the idling time data determined in the idling time measuring process of Step S20 is saved, similar to Step S35 of the first embodiment. Next, in Step S46, it is determined whether or not the average value of the idling time data saved in Step S35 is smaller than a preset second predetermined value. If the average value of the idling time is greater than or equal to the second predetermined value, a warning lamp (MIL) is illuminated in Step S44. If the idling time is smaller than the second predetermined value in Step S46, the worn condition determination process ends without illuminating the warning lamp MIL.

In the second embodiment, the average value of the data representing the idling time is determined based on the average value of the Δ idling time. On the other hand, in the third embodiment, the average value of the idling time data is directly determined based on the idling time, which is then used to determine the worn condition based on that average value.

Figure 16:
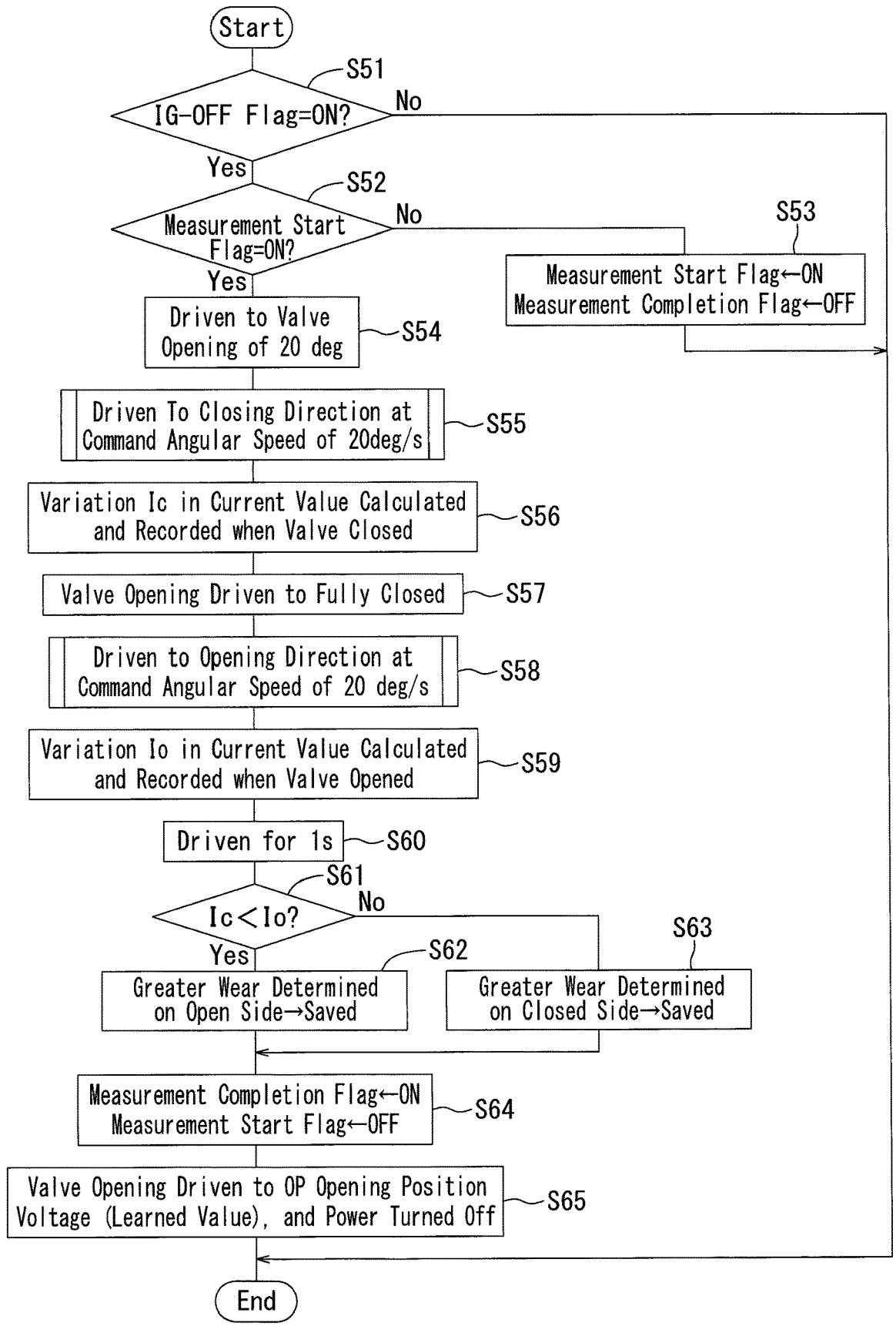
FIG. 16 is a flowchart corresponding to FIG. 10 according to a fourth embodiment.

FIG. 16 shows a fourth embodiment. In the fourth embodiment, a first deterioration and second deterioration are used for determining the throttle valve deterioration. In this embodiment, the first deterioration occurs on the side of the gearing where contact is made when the throttle valve is operated to open from the opener opening position. The second deterioration occurs on the side of the gearing where contact is made when the throttle valve is operated to close from the opener opening position. A distinction between the fourth embodiment and the above-described first embodiment (see FIG. 10) is that the fourth embodiment enables the system to identify which of the first or second deteriorated condition has advanced more. Other configurations are essentially identical in the both embodiments, and repetition of the corresponding description will be omitted.

In FIG. 16, in Step S51, it is determined whether or not the IG-OFF flag has been set to ON. When an ignition switch is turned off to stop the internal combustion engine, the IG-OFF flag will be set to ON. If the IG-OFF flag has been set to ON, Step S51 is determined to be positive. It will then be determined whether or not the measurement start flag has been set to ON in Step S52. If the measurement start flag has not been set to ON, Step S52 is determined to be negative.

Figure 17:
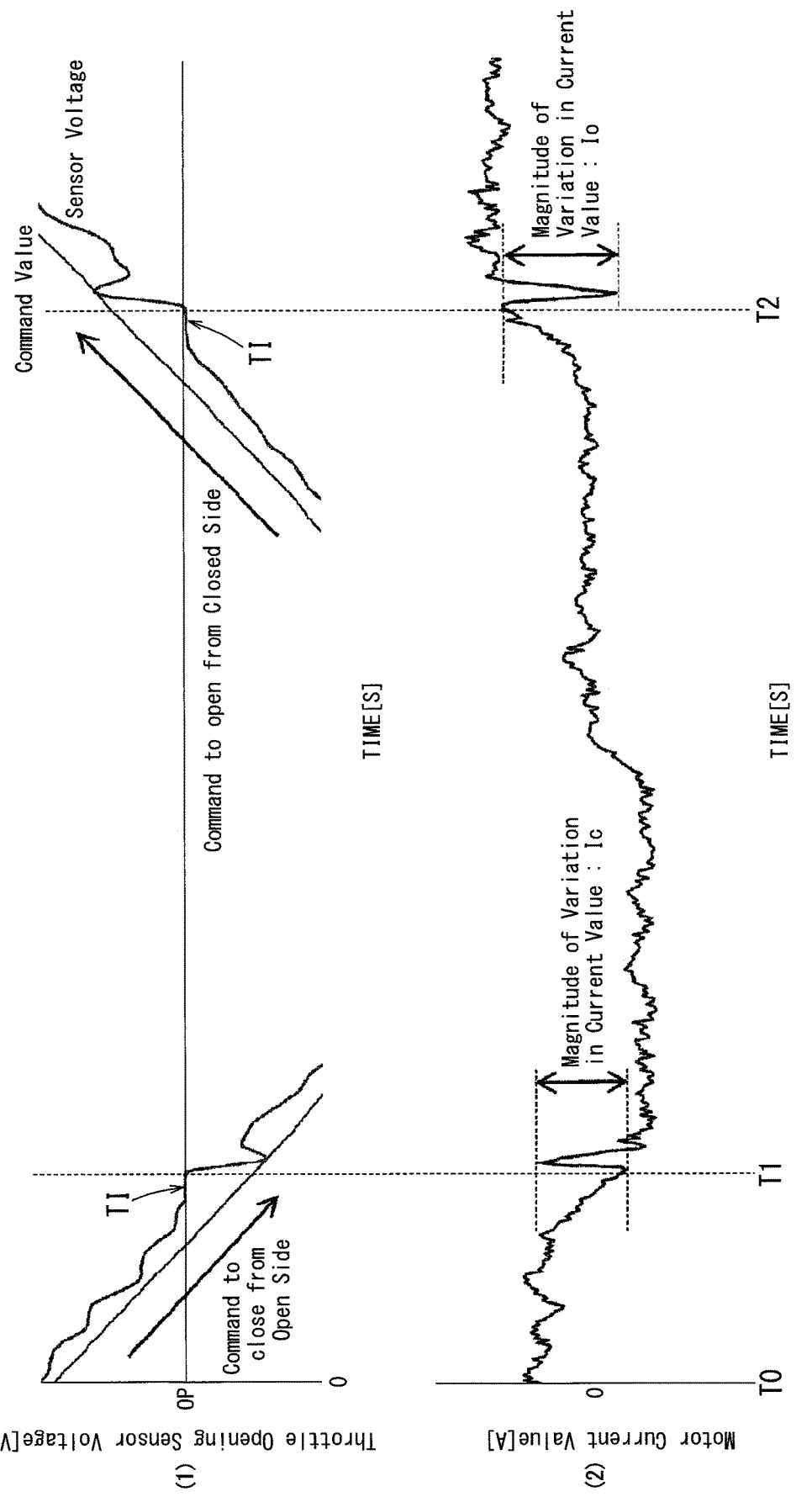
FIG. 17 is a time chart illustrating measurements during the measuring mode of the fourth embodiment.

In such a case, in Step S53, the measurement start flag is set to ON and the measurement completion flag is set to OFF. Here, the throttle operation timer starts to measure. After the measurement start flag has been set to ON, Step S52 is determined to be positive. In Step S54, the throttle valve 20 is opened, for example, from a fully closed position to a 20 degree open side position (which is reached at Time TO in FIG. 17). Next, in Step S55, the throttle valve 20 is operated to close at a speed of 20 degrees per second. In Step S56, a variation Ic in the driving current of the motor 30 immediately after the intermediate gear 62 has idled, which occurs over a period of time indicated by TI in FIG. 17(1), for a predetermined period of time is determined (which begins at Time T1 in FIG. 17).

The intermediate gear 62 idles (e.g., does not actively move the throttle valve 20) when the throttle valve 20 passes by the opener opening position OP. Therefore, the throttle valve 20 is no longer able of following the command value of the desired throttle opening amount. To catch up the delay in following, the driving current of the motor 30 significantly changes, which occurs at Time T1 in FIG. 17. Thus, the variation Ic in the driving current of the motor corresponds to the idling time of the intermediate gear 62. More specifically, the variation Ic in the driving current of the motor 30 corresponds to an amount of wear of the intermediate gear 62. Therefore, the variation Ic in the driving current of the motor 30 is detected as a behavior of the drive mechanism.

In Step S57 of FIG. 16, the throttle valve 20 is operated to close to the fully closed state. In a following Step S58, the throttle valve 20 is operated to open at the same speed as Step S55, which is at a speed of 20 degrees per second in this embodiment. Then, in Step S59, a variation Io of the driving current of the motor 30 immediately after the intermediate gear 62 has idled, which occurs for a period of time indicated by TI in FIG. 17(1), for a predetermined period of time is determined (which occurs at Time T2 in FIG. 17). In Step S60, the opening operation of the throttle opening continues for a preset period of time, for example for one second. This period of time is counted by the above-described throttle operation timer.

In Step S61 of FIG. 16, the variation Ic in the driving current of the motor 30 determined in Step S56 is compared with the variation Io in the driving current of the motor 30 determined in Step S59. Based on this comparison, if the second variation Io is greater than the first variation Ic, it is determined that the amount of wear of the intermediate gear 62 on the side where the throttle valve 20 is operated to open from the opener opening position is greater than the amount of wear on the side where the throttle valve 20 is operated to close from the opener opening position, and this result is saved in Step S62. Further, if first variation Ic is greater than the second variation Io, it is determined that the amount of wear on the side where the throttle valve 20 is operated to close from the opener opening position is greater than the amount of wear on the side where the throttle valve 20 is operated to open from the opener opening position, and this result is saved in Step S63. Subsequently, in Step S64, the measurement completion flag is set to ON and the measurement start flag is set to OFF. Consequently, the above-described throttle operation timer is stopped from operating. Next, in Step S65, energization of the control circuit 70 is shut OFF when the throttle valve 20 has been moved to the opener opening position OP. The opener opening position OP may be a learned value.

In FIG. 16, the process of Step S55 corresponds to an embodiment of a throttle valve close operation unit of the summary. The process in Step S58 corresponds to an embodiment of a throttle valve open operation unit of the summary. The process in Step S56 corresponds to an embodiment of a close operation behavior detecting unit of the summary. The process in Step S59 corresponds to an embodiment of an open operation behavior detecting unit of the summary. The process in Step S61 corresponds to an embodiment of an identification unit of the summary.

According to the fourth embodiment, it is possible to identify on which side of the intermediate gear 62 the wear (deterioration) has advanced more, either the side where it is operated to open from the opener opening position of the throttle valve 20 or the side where it is operated to close. Therefore, it is possible to select a throttle device 10 that meets the needs of a user if a used electronic throttle device 10 is used as a rebuild product. That is, a rebuilt product with the side operated to close from the opener opening position of the intermediate gear 62 being more deteriorated is provided for the user who more often uses the open side from the opener opening position. On the other hand, a rebuilt product with the side operated to open from the opener opening position of the intermediate gear 62 is more deteriorated is provided for the user who more often uses the closed side from the opener opening position. By doing so, the deteriorated electronic throttle device 10 can be more effectively utilized as a rebuilt product. As a result, it is possible to reduce carbon dioxide emissions, which are generated when producing new electronic throttle devices 10.

Although the technology disclosed herein has been described above with regard to the specific embodiments, it can also be implemented in other various forms. For example, a case in which an electronic throttle device is mounted on an automobile has been described in the above-described embodiments. However, the above embodiments may also be applied to components mounted on vehicles other than automobiles. Further, in the first embodiment, the deterioration estimation circuit estimates a deteriorated condition based on the length of the period of time during which the opening operation speed of the throttle valve while the motor is continuously operated is lower than a predetermined value. Alternatively, the deteriorated condition may instead be estimated based on the magnitude of the deviation of the opening and/or closing operation of the throttle valve, for instance with respect to the operation values of the motor. For example, the deteriorated condition may instead be estimated based on whether or not the difference between the opening operation command value of the throttle valve and the value detected by the throttle opening sensor has reached a values higher than or equal to a preset value. Furthermore, as in the fourth embodiment, the deterioration condition may instead be estimated based on the variation in the motor current after the intermediate gear has idled.

In the first embodiment, the worn condition of the intermediate gear is estimated based on the idling time of the intermediate gear (or throttle gear), which occurs when the throttle valve is operated to open, such that is passes by the opener opening position. Alternatively, the worn condition of the intermediate gear (or throttle gear) may instead be estimated based on the idling time of the intermediate gear, which occurs when the throttle valve is operated to close, such that it passes by the opener opening position.

The control circuit 70 may include at least one programmed electronic processor. The control circuit 70 may include at least one memory configured to store instructions or software to be executed by the electronic processor to carry out at least one of the functions of the control circuit 70 described herein. For example, in some embodiments, the control circuit 70 may be implemented as a microprocessor with a separate memory.

The electronic throttle device 10 may include a memory. The memory may include a volatile and/or a non-volatile memory. Examples of memory may include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof.

Where the term "processor" or "central processing unit" or "CPU" is used for identifying a unit performing specific functions, it should be understood that, unless otherwise explicitly stated, those functions can be carried out by a single processor or multiple processors arranged in any form, including parallel processors, serial processors, tandem processors, or cloud processing/cloud computing configurations. The software may include, for example, firmware, one or more applications, program data, filters, rules, one or more program modules, and/or other executable instructions.

What is claimed is:

1. A method for estimating deterioration of an electronic throttle device, the method comprising:
   driving a throttle valve disposed in an intake passage of an internal combustion engine by a drive mechanism; and
   instructing the throttle valve to continuously operate to open from a first opening position, wherein the first opening position is on a closed side relative to an opener opening position and in which the throttle valve is biased toward an open side by an opener mechanism, to a second opening position, wherein the second opening position is on the open side relative to the opener opening position and in which the throttle valve is biased toward the closed side by the opener mechanism
   detecting a behavior of the throttle valve when the throttle valve passes by the opener opening position; and
   estimating a deteriorated condition of the electronic throttle device based on the detected behavior;
   wherein the drive mechanism comprises:
   a motor as a drive source;
   a motor gear provided on an output shaft of the motor;
   a throttle gear configured to open and close the throttle valve; and
   an intermediate gear disposed between the throttle gear and the motor gear so as to mesh with the throttle gear and the motor gear;
   wherein the method further comprises estimating the deteriorated condition of the throttle device based on an idling time during which the intermediate gear rotates without rotating the throttle gear while a meshing state between the throttle gear and the intermediate gear is switching due to an effect caused by switching a biasing direction of the opener mechanism when the throttle valve passes by the opener opening position while being operated to open.

2. The method of claim 1, further comprising driving the throttle valve by the drive mechanism utilizing a throttle opening sensor for detecting an opening amount of the throttle valve.

3. The method of claim 1, further comprising determining the idling time of the intermediate gear by a time at which an opening operation speed or a closing operation speed of the throttle valve is lower than a predetermined value for a certain period of time.

4. The method of claim 1, further comprising determining the idling time of the intermediate gear based on time data only exceeding a preset lower limit period of time.

5. The method of claim 1, further comprising determining the idling time by calculating an average value of multiple idling time measurement results.

6. The method of claim 1, wherein the electronic throttle device comprises:
   a throttle valve open operation circuit configured to continuously operate the throttle valve to open by driving the drive mechanism from the first opening position to the second opening position;
   a throttle valve close operation circuit configured to continuously operate the throttle valve to close by driving the drive mechanism from the second opening position to the first opening position;
   an open operation behavior detecting circuit configured to open the throttle valve by the throttle valve open operation circuit and configured to detect the behavior of the drive mechanism when the throttle opening passes by the opener opening position;
   a close operation behavior detecting circuit configured to close the throttle valve by the throttle valve close operation circuit and configured to detect the behavior of the drive mechanism when the throttle opening passes by the opener opening position, and
   an identification circuit configured to compare the behavior detected by each of the open operation behavior detecting circuit and the close operation behavior detecting circuit to identify on which side of the drive mechanism the deteriorated condition has advanced more, either a side where the throttle valve is operated to open from the opener opening position or a side where the throttle valve is operated to close from the opener opening position.

7. The method of claim 6, wherein the open operation behavior detecting circuit and the close operation behavior detecting circuit are configured to detect the behavior of the drive mechanism based on a magnitude of variation in driving current of the drive mechanism.

8. The method of claim 1, further comprising determining the idling time of the intermediate gear by comparing a currently measured value of the idling time with an initial idling time measured when the electronic throttle device was started to be used, excluding an abnormal value in which the currently measured value is shorter than the initial idling time.

9. The method of claim 8, further comprising using an idling time difference, which is determined by subtracting the initial idling time from the currently measured value of the idling time, as the idling time of the intermediate gear.

10. A method for estimating deterioration of an electronic throttle device, the method comprising:
    driving a throttle valve disposed in an intake passage of an internal combustion engine by a drive mechanism, wherein the throttle valve has a first opening position and a second opening position; and
    instructing the throttle valve to open from the second opening position, wherein the second opening position is on an open side relative to an opener opening position and in which the throttle valve is biased toward a closed side by an opener mechanism, to the first opening position, wherein the first opening position is on the closed side relative to the opener opening position and in which the throttle valve is biased toward the open side by the opener mechanism;

detecting a behavior of the throttle valve when the throttle valve passes by the opener opening position; and estimating a deteriorated condition of the electronic throttle device based on the detected behavior;

wherein the drive mechanism comprises:

a motor as a drive source;

a motor gear provided on an output shaft of the motor;

a throttle gear configured to open and close the throttle valve; and an intermediate gear disposed between the throttle gear and the motor gear so as to mesh with the throttle gear and the motor gear;

wherein the method further comprises estimating the deteriorated condition of the throttle device based on an idling time during which the intermediate gear rotates without rotating the throttle gear while a meshing state between the throttle gear and the intermediate gear is switching due to an effect caused by switching a biasing direction of the opener mechanism when the throttle valve passes by the opener opening position while being operated to close.

11. The method of claim 10, further comprising determining the idling time of the intermediate gear by a time at which an opening operation speed or a closing operation speed of the throttle valve is lower than a predetermined value for a certain period of time.

12. The method of claim 10, further comprising determining the idling time of the intermediate gear based on time data only exceeding a preset lower limit period of time.

13. The method of claim 10, further comprising determining the idling time by calculating an average value of multiple idling time measurement results.

14. The method of claim 10, further comprising driving the throttle valve by the drive mechanism utilizing a throttle opening sensor for detecting an opening amount of the throttle valve.

15. The method of claim 10, further comprising determining the idling time of the intermediate gear by comparing a currently measured value of the idling time with an initial idling time measured when the electronic throttle device was started to be used, excluding an abnormal value in which the currently measured value is shorter than the initial idling time.

16. The method of claim 15, further comprising using an idling time difference, which is determined by subtracting the initial idling time from the currently measured value of the idling time, as the idling time of the intermediate gear.

17. The method of claim 10, wherein the electronic throttle device comprises:

a throttle valve open operation circuit configured to continuously operate the throttle valve to open by driving the drive mechanism from the first opening position to the second opening position;

a throttle valve close operation circuit configured to continuously operate the throttle valve to close by driving the drive mechanism from the second opening position to the first opening position;

an open operation behavior detecting circuit configured to open the throttle valve by the throttle valve open operation circuit and configured to detect the behavior of the drive mechanism when the throttle opening passes by the opener opening position;

a close operation behavior detecting circuit configured to close the throttle valve by the throttle valve close operation circuit and configured to detect the behavior of the drive mechanism when the throttle opening passes by the opener opening position, and an identification circuit configured to compare the behavior detected by each of the open operation behavior detecting circuit and the close operation behavior detecting circuit to identify on which side of the drive mechanism the deteriorated condition has advanced more, either a side where the throttle valve is operated to open from the opener opening position or a side where the throttle valve is operated to close from the opener opening position.

18. The method of claim 17, wherein the open operation behavior detecting circuit and the close operation behavior detecting circuit are configured to detect the behavior of the drive mechanism based on a magnitude of variation in driving current of the drive mechanism.

19. A method for estimating deterioration of an electronic throttle device, the method comprising:

driving a throttle valve disposed in an intake passage of an internal combustion engine by a drive mechanism; and instructing the throttle valve to continuously operate to open from a first opening position, wherein the first opening position is on a closed side relative to an opener opening position and in which the throttle valve is biased toward an open side by an opener mechanism, to a second opening position, wherein the second opening position is on the open side relative to the opener opening position and in which the throttle valve is biased toward the closed side by the opener mechanism;

detecting a behavior of the throttle valve when the throttle valve passes by the opener opening position; and estimating a deteriorated condition of the electronic throttle device based on the detected behavior; and activating the method while an ignition switch of the internal combustion engine is turned off and while the electronic throttle device is mounted on a vehicle.

20. A method for estimating deterioration of an electronic throttle device, the method comprising:

driving a throttle valve disposed in an intake passage of an internal combustion engine by a drive mechanism;

instructing the throttle valve to operate to close from a second opening position, wherein the second opening position is on an open side relative to an opener opening position and in which the throttle valve is biased toward a closed side by an opener mechanism, to a first opening position, wherein the first opening position is on the closed side relative to the opener opening position and in which the throttle valve is biased toward the open side by the opener mechanism, and activating the method while an ignition switch of the internal combustion engine is turned off and while the electronic throttle device is mounted on a vehicle.

* * * * *